(12) United States Patent
Ikeno et al.

(10) Patent No.: US 7,697,172 B2
(45) Date of Patent: Apr. 13, 2010

(54) IMAGE SENSOR, IMAGE READING DEVICE, AND IMAGE RESOLUTION SETTING METHOD

(75) Inventors: Takahiro Ikeno, Owariasahi (JP); Tatsuya Sato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1256 days.

(21) Appl. No.: 10/805,239

(22) Filed: Mar. 22, 2004

(65) Prior Publication Data

US 2004/0190083 A1 Sep. 30, 2004

(30) Foreign Application Priority Data

Mar. 24, 2003 (JP) ............... 2003-080853

(51) Int. Cl.
*H04N 1/04* (2006.01)
(52) U.S. Cl. .................... 358/474; 358/482
(58) Field of Classification Search ............. 358/482, 358/513, 474; 250/208.1
See application file for complete search history.

(56) References Cited

U.S. PATENT DOCUMENTS 6,473,538 B2 * 10/2002 Kozuka .............. 382/312
2002/0135827 A1 * 9/2002 Saika ................ 358/513

FOREIGN PATENT DOCUMENTS

| JP | 62194775 | | 8/1987 |
|---|---|---|---|
| JP | A 5-227362 | | 9/1993 |
| JP | 06303378 | * | 10/1994 |
| JP | 11234473 | | 8/1999 |
| JP | A 2000-101803 | | 7/2000 |
| JP | 2002185698 | * | 6/2002 |
| JP | A 2002-185698 | | 6/2002 |

OTHER PUBLICATIONS

Moss et al., Logic Element, The Electrical Engineering Handbook, 2000.*

* cited by examiner

*Primary Examiner*—Douglas Q Tran
(74) *Attorney, Agent, or Firm*—Oliff & Berridge, PLC

(57) ABSTRACT

An image sensor including a plurality of photoelectric converter elements each operable to convert an optical signal into an electric signal, a plurality of channel selector switches selectively turned on and off to selectively connect and disconnect output portions of the corresponding photoelectric converter elements to and from a common signal line, in synchronization with a clock pulse signal, and a resolution setting portion operable to receive a resolution setting timing signal, and first and second resolution setting signals, and to select one of a plurality of on-off control patterns of the channel selector switches, for thereby setting an image resolution value of the image sensor, on the basis of on-off states of the first and second resolution setting signals upon at least one of rising and falling of the resolution setting timing signal. Also disclosed are an image reading device including the image sensor, and an image resolution setting method using the resolution setting timing signal and the first and second resolution setting signals.

30 Claims, 10 Drawing Sheets

IMAGE SENSOR, IMAGE READING DEVICE, AND IMAGE RESOLUTION SETTING METHOD

The present application is based on Japanese Patent Application No. 2003-080853 filed on Mar. 24, 2003, the content of which is incorporated herein by reference.

BACKGROUND OF THE INVENTION

1. Field of the Invention

The present invention relates to an image sensor, an image reading device, and an image resolution setting method.

2. Discussion of Related Art

Conventional facsimile machines, copying machines and manually operated image scanners use image sensors. A typical example of such image sensors is shown in FIG. 11, wherein P1$a$-P1$e$ represent respective photoelectric converter elements such as phototransistors arranged to produce an electric current (image signal) upon detection of a light, and P2 represents a power input terminal through which a line voltage $V_{DD}$ is applied to the image sensor. P3$a$-P3$e$ represent respective channel selector switches connected to electric-charge output portions of the respective photoelectric converter elements P1$a$-P1$e$, and P4 represents a shift register array which consists of shift registers P4$a$-P4$f$ and which is operable in response to a start signal S1, to sequentially turn on and off the channel selector switches P3$a$-P3$e$ in a predetermined order (e.g., in the order of P3$a$→P3$b$→P3$c$→P3→dP3$e$) at a time interval corresponding to a period of a clock pulse signal CLK, so that image signals generated by the respective photoelectric converter elements P1$a$-P1$e$ sequentially outputted from an image-signal output terminal P11 through a common signal line P7, in a predetermined order (e.g., in the order of the image signals of the elements P1$a$→P1$b$→P1$c$→P1$d$→P1$e$). Further, P5 represents a start-signal input terminal through which the start signal S1 is applied to the shift register array P4, and P6 represents a clock pulse input terminal through which the clock pulse signal CLK is applied to the shift register array P4.

P8 represents a flip-flop arranged to keep generating an ON signal during an operation of the shift register array P4 after the Shift register array P4 is started in response to the start signal S1, that is, during a time period from the moment when the start signal S1 is applied to the first shift register P4$a$, to the moment when the start signal S1 is outputted from the sixth shift register P4$f$. P9 represents a chip selector switch which is connected in series with the common signal line P7 and which is brought to an open state upon reception of the ON signal from the flip-flop P8. P10 represents a switch which is connected between the common signal line P7 and a ground terminal P12 and which is alternately opened and closed according to a change in the level of the clock pulse signal CLK.

Then, an operation of the conventional image sensor will be described. Initially, the start signal S1 and the clock pulse signal CLK are applied from an external device to the shift register array P4 through the start-signal input terminal P5 and the clock-pulse input terminal P6, respectively The start signal S1 has a period two times that of the clock pulse signal CLK, and is applied to the shift register P4$a$ of the shift register array P4, upon falling of the clock pulse signal CLK.

When the start signal S1 is applied to the shift register P4$a$, this shift register P4$a$ is started. As a result, the shift register P4$a$ holds the channel selector switch P3$a$ in its closed state for a length of time corresponding to the period of the clock pulse signal CLK, so that the image signal generated by the photoelectric converter element P1$a$ is outputted from the image-signal output terminal P11 through the common signal line P7. Then, the shift register P4$a$ returns the channel selector switch P3$a$ to its open state, and transfers the received start signal S1 to the next shift register P4$b$.

Thus, the start signal S1 is sequentially transferred to the shift registers P4$b$, P4$c$, P4$d$ and P4$e$ in this order of description, so that the image signals generated by the photoelectric converter elements P1$b$-P1$e$ are sequentially outputted from the image-signal output terminal P11. Further, the start signal S1 is transferred from the last shift register P4$f$ through a terminal P13 to an image sensor in the next stage IC.

In the field of this type of image sensor, there has been proposed a method of setting the image resolution in one of two steps by selecting one of two values of an electric current to be outputted to an image-signal output terminal 11, according to a control signal CONTROL received from an external device. An example of this proposed image resolution setting method is disclosed in JP-5-227362A.

In the proposed image resolution setting method, however, the image resolution is variable in only two steps corresponding to the respective high (H) and low (L) levels of the control signal. On the other hand, there has been a need of setting the image resolution in more than two steps or multiple steps, depending upon a specific application of the image sensor.

SUMMARY OF THE INVENTION

It is a first object of the present invention to provide an image sensor capable of easily setting the image resolution in multiple steps. A second object of this invention is to provide an image reading device capable of easily setting the image resolution in multiple steps. A third object of the invention is to provide a method of facilitating the setting of the image resolution of an image sensor in multiple steps.

One of the first, second and third objects may be achieved according to any one of the following modes of this invention, each of which is numbered like the appended claims and depends from the other mode or modes, where appropriate, for easier understanding of technical features disclosed in the present application, and possible combinations of those features. However, it is to be understood that the invention is not limited to those technical features or combinations thereof, and that any one of a plurality of technical features described below with respect to any one mode of the invention may be a subject matter of this invention, without the other technical feature or features being combined with that one feature.

(1) An image sensor comprising:

a plurality of photoelectric converter elements each operable to convert an optical signal into an electric signal;

a plurality of channel selector switches which correspond to the photoelectric converter elements and which are selectively turned on and off to selectively connect and disconnect output portions of the corresponding photoelectric converter elements to and from a common signal line, in synchronization with a clock pulse signal; and a resolution setting portion operable to receive a resolution setting timing signal, a first resolution setting signal and a second resolution setting signal, and to select one of a plurality of on-off control patterns of the plurality of channel selector switches, on the basis of on-off states of the first and second resolution setting signals upon at least one of rising and falling of the resolution setting timing signal, the plurality of channel selector switches being selectively turned on and off in the selected on-off control pattern, to set an image resolution value of the image sensor.

In the image sensor according to the above mode (1) of this invention, the on-off states of the first and second resolution setting signals are detected upon rising and/or falling of the resolution setting timing signal. There are four combinations of the on and off states of the first and second resolution setting signals, for each of a rise and a fall of the resolution setting timing signal. If the on-off states of the first and second resolution setting signals are detected upon rising or falling of the resolution setting timing signal, there are four combinations of the on and off states of the first and second resolution setting signals. If the on-off states of the first and second resolution setting signals are detected upon both rising and falling of the resolution setting timing signal or upon rising or falling of each of two successive pulses of the resolution setting timing signal, there are 16 combinations of the on and off states of the first and second resolution setting signals.

As described above, there are available a plurality or multiplicity of combinations of the on and off states of the two resolution setting signals, by suitably changing the waveforms or the timings of rise and fall of the resolution setting timing signals or the two resolution setting signals. Accordingly, there are available a plurality or multiplicity of on-off control patterns of the channel selector switches, which correspond to the respective combinations of the on and off states of the two resolution setting signals. The channel selector switches are selectively turned on and off in a selected one of the on-off control patterns, to set the image resolution value of the image sensor which corresponds to the selected on-off control pattern. Therefore, the present image sensor permits an intricate adjustment of the resolution value of an image read by the image sensor.

(2) The image sensor according to the above mode (1), further comprising a shift register circuit operable to selectively turn on and off the plurality of channel selector switches in the on-off control pattern selected by the resolution setting portion, and wherein the resolution setting portion receives the resolution setting timing signal and the first and second resolution setting signals from an external device, the resolution setting timing signal and the first and second resolution setting signals being selected from a group consisting of a control signal for setting the image resolution value, a start signal for starting the shift register circuit, and the clock pulse signal.

In the image sensor according to the above mode (2), the shift register is provided to selectively turn on and off the plurality of channel selector switches in the on-off control pattern selected by the resolution setting portion. Further, the control signal, start signal and clock pulse signals are used as the resolution setting timing signal and the first and second resolution setting signals, so that the number of the signals required for controlling the image sensor is reduced.

(3) The image sensor according to the above mode (2), wherein the resolution setting timing signal is one of the control signal and the clock pulse signal, and the resolution setting portion prevents the start signal from starting the shift register circuit for a predetermined length of time after a moment of the rising or falling of the resolution setting timing signal.

In the image sensor according to the above mode (3), the resolution setting timing signal is the first or second resolution setting signal and is not the start signal, the moment of rising or falling of the start signal may vary depending upon the selected on-off control pattern of the channel selector switches, during an operation of the resolution setting portion. In the present image sensor, however, the starting of the shift register circuit by the start signal is prevented for the predetermined length of time after the moment of rising or falling of the start signal, that is, during an operation of the resolution setting portion. In this case, the shift register circuit is started by the start signal when this start signal is turned on after the operation of the resolution setting portion to set the image resolution value.

The arrangement according to the above mode (3) prevents a variation of the timing of starting the reading of an image by the image sensor, even if the moment of rising or falling of the start signal varies during the operation of the resolution setting portion.

(4) The image sensor according to any one of the above modes (1)-(3), wherein the resolution setting portion is operated to set the image resolution value before each line of image is read by operation of the plurality of photoelectric converter elements.

The image sensor according to the above mode (4) is arranged to set the image resolution value for each line of image to be read. In this case, the image sensor can be easily controlled by repeatedly executing a stored control program formulated to perform a series of operations to set the image resolution for each line of image and read this line of image.

(5) The image sensor according to any one of the above modes (1)-(3), wherein the resolution setting portion is operated to set the image resolution value before each page of image is read by operation of the plurality of photoelectric converter elements and the plurality of channel selector switches.

The image sensor according to the above mode (5) is arranged to set the image resolution for each page of image. In this case, the required frequency of setting of the image resolution is reduced, with a result of reducing the time required for reading the desired image.

(6) The image sensor according to any one of the above modes (2)-(5), wherein the shift register circuit is operable to simultaneously turn on a plurality of adjacent switches of the plurality of channel selector switches, when the image resolution value set by the resolution setting portion is other than a highest one of a plurality of image resolution values available by an operation of the resolution setting portion, the number of the adjacent switches varying depending upon the image resolution value set by the resolution setting portion. In this case, the shift register circuit is preferably arranged to turn on successive groups of the channel selector switches each group consisting of the above-indicted adjacent switches, in synchronization with respective successive pulses of the clock pulse signal. Further preferably, an image reading device including the present image sensor comprises a feeding device arranged to move a row of the photoelectric converter element and an original carrying an image, relative to each other in a direction perpendicular to a direction of extension of the row, at a speed which increases with an increase in the number of the plurality of adjacent switches.

In the case of selection of the image resolution value other than the highest value, the level of the electric signal generated by each photoelectric converter element is relatively low due to a decrease in the cycle time during which the optical signals are received by the converter elements and the electric signals are generated by the converter elements. However, the arrangement of the shift register circuit to simultaneously turn on the adjacent ones of the channel selector switches so that the electric signals are simultaneously fed from those adjacent channel selector switches to the common signal line, making it possible to prevent a decrease in the output of the common signal line, and assure a relatively high S/N ratio of an image signal obtained from the electric signals, when the relatively low image resolution value is set by the resolution setting portion. The number of the adjacent channel selector switches that are simultaneously turned on is represented by natural number "n", where the image resolution value set by the resolution setting portion is 1/n of the highest image resolution value. The above-indicted cycle time is reduced since the successive groups of the channel selector switches are turned on in synchronization with the respective pulses of the clock pulse signal. To increase the image reading efficiency of the entire image, the start signal to start the reading of each line of image is required to be generated at a frequency which increases with an increase in the number of the plurality adjacent switches to be simultaneously turned on. In other words, the feeding device of the image reading device including the image sensor is required to move the row of the photoelectric converter elements and the original at a speed which increases with an increase in the number of the adjacent channel selector switches to be simultaneously turned on.

(7) The image sensor according to any one of the above modes (1)-(6), wherein the electric signals generated as image signals by the plurality of photoelectric converter elements are accompanied by an image resolution signal indicative of the image resolution value set by the resolution setting portion.

In the image sensor according to the above mode (7), the image signals generated by the image sensor are followed by the image resolution signal indicative of the image resolution value set by the resolution setting data. Accordingly, an image reading device including the present image sensor can confirm that the image resolution value has been correctly set by the resolution setting portion of the image sensor. If the image resolution value has not been correctly set, the image reading device may activate an alarm indicator or a display device to provide a suitable warning signal or commands the image reader to cease the image reading operation.

(8) An image reading device comprising:
an image sensor according to the above mode (1);
a resolution-setting-timing-signal generating portion operable to generate the resolution setting timing signal;
a first resolution-setting-signal generating portion operable to generate the first resolution setting signal;
a second resolution-setting-signal generating portion operable to generate the second resolution setting signal; and
a control portion operable to control the resolution-setting-timing-signal generating portion and the first and second resolution-setting-signal generating portions.

In the image reading device according to the above mode (8) of this invention, which comprises the image sensor constructed as described above with respect to the above mode (1), the image resolution value with which an image is read by the image sensor can be changed in two or more steps.

(9) The image reading device according to the above mode (8), further comprising a shift register circuit operable to selectively turn on and off the plurality of channel selector switches in the on-off control pattern selected by the resolution setting portion, and wherein the resolution setting timing signal and the first and second resolution setting signals which are respectively generated by the resolution-setting-timing-signal generating portion and the first and second resolution-setting-signal generating portions are selected from a group consisting of a control signal for setting the image resolution value, a start signal for starting the shift register circuit, and the clock pulse signal.

The image reading device according to the above mode (9) has substantially the same advantage as described above with respect to the above mode (2).

(10) The image reading device according to the above mode (9), wherein the resolution-setting-timing-signal generating portion and the first and second resolution-setting-signal generating portions generate the control signal, the start signal and the clock pulse signal respectively, and the control portion controls the on-off states of the start signal and the clock pulse signal upon at least one of rising and falling of the control signal.

In the image reading device according to the above mode (10), the resolution-setting-timing-signal generating portion and the first and second resolution-setting-signal generating portions are controlled by the control portion, such that the on-off states of the start signal and the clock pulse signal upon rising and/or falling of the control signal are controlled to set the desired image resolution value of the image sensor. In this mode of the invention, the resolution setting portion can determine the on-off control pattern of the channel selector switches, with high reliability, on the basis of the on-off states of the start signal and the clock pulse signal that are controlled by the control portion to set the desired image resolution value.

(11) The image reading device according to the above mode (9), wherein the resolution setting timing signal is one of the control signal and the clock pulse signal, and the shift register circuit is not started by the start signal for a predetermined length of time after a moment of the rising or falling of the resolution setting timing signal.

The image reading device according to the above mode (11) has substantially the same advantage as described above with respect to the above mode (3).

(12) The image reading device according to the above mode (9) or (10), wherein the resolution-setting-timing-signal generating portion generates one of the control signal and the clock pulse signal, as the resolution setting timing signal, and the control portion controls one of the resolution-setting-timing-signal generating portion and the first and second resolution-setting-signal generating portions, to generate the start signal again, to start the shift register circuit, after the image resolution value is set by the resolution setting portion.

In the image reading device according to the above mode (12), the start signal is disabled as the signal to start the shift register circuit while the control signal or the clock pulse signal used as the resolution setting timing signal is in the on state, that is, during an operation of the resolution setting portion to set the image resolution value. In this case, the shift register circuit is started by the start signal generated after the resolution setting signal is brought to the off state. This arrangement permits starting of the shift register circuit after the setting of the image resolution value.

(13) The image reading device according to any one of the above modes (8)-(12), wherein the resolution setting portion is operated to set the image resolution value before each line of image is read by operations of the plurality of photoelectric converter elements and the plurality of channel selector switches.

The image reading device according to the above mode (13) has substantially the same advantage as described above with respect to the above mode (4).

(14) The image reading device according to any one of the above modes (8)-(12), wherein the resolution setting portion is operated to set the image resolution value before each page of image is read by operation of the plurality of photoelectric converter elements and the plurality of channel selector switches.

The image reading device according to the above mode (14) has substantially the same advantage as described above with respect to the above mode (5).

(15) The image reading device according to any one of the above modes (8)-(14), wherein the shift register circuit is operable to simultaneously turn on a plurality of adjacent switches of the plurality of channel selector switches, when the image resolution value set by the resolution setting portion is other than a highest one of a plurality of image resolution values available by an operation of the resolution setting portion, the number of the adjacent switches varying depending upon the image resolution value set by the resolution setting portion,.

The image reading device according to the above mode (15) has substantially the same advantage as described above with respect to the above mode (6).

(16) The image reading device according to any one of the above modes (8)-(15), wherein the electric signals generated as image signals by the plurality of photoelectric converter elements are accompanied by an image resolution signal indicative of the image resolution value set by the resolution setting portion.

The image reading device according to the above mode (16) has substantially the same advantage as described above with respect to the above mode (7).

(17) A method of setting an image resolution of an image sensor comprising a plurality of photoelectric converter elements each operable to convert an optical signal into an electric signal, and a plurality of channel selector switches which correspond to the photoelectric converter elements and which are selectively turned on and off to selectively connect and disconnect output portions of the corresponding photoelectric converter elements to and from a common signal line, in synchronization with a clock pulse signal, the method comprising the steps of:

generating a resolution setting timing signal, a first resolution setting signal and a second resolution setting signal; and selecting one of a plurality of on-off control patterns of the plurality of channel selector switches, on the basis of on-off states of the first and second resolution setting signals upon at least one of rising and falling of the resolution setting timing signal the plurality of channel selector switches being selectively turned on and off in the selected on-off control pattern, to set an image resolution value of the image sensor.

The image resolution setting method according to the above mode (17) of this invention has substantially the same advantage as described above with respect to the image reader according to the above mode (1).

(18) The method according to the above mode (17), wherein the image sensor further comprises a shift register operable to selectively turn on and off the plurality of channel selector switches in the on-off control pattern selected by the resolution setting portion, and wherein the resolution setting timing signal and the first and second resolution setting signals are generated from an external device, and selected from a group consisting of a control signal for setting said image resolution value, a start signal for starting the shift register, and the clock pulse signal.

The method according to the above mode (18) has substantially the same advantage as described above with respect to the above mode (2).

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENT

Figure 1:
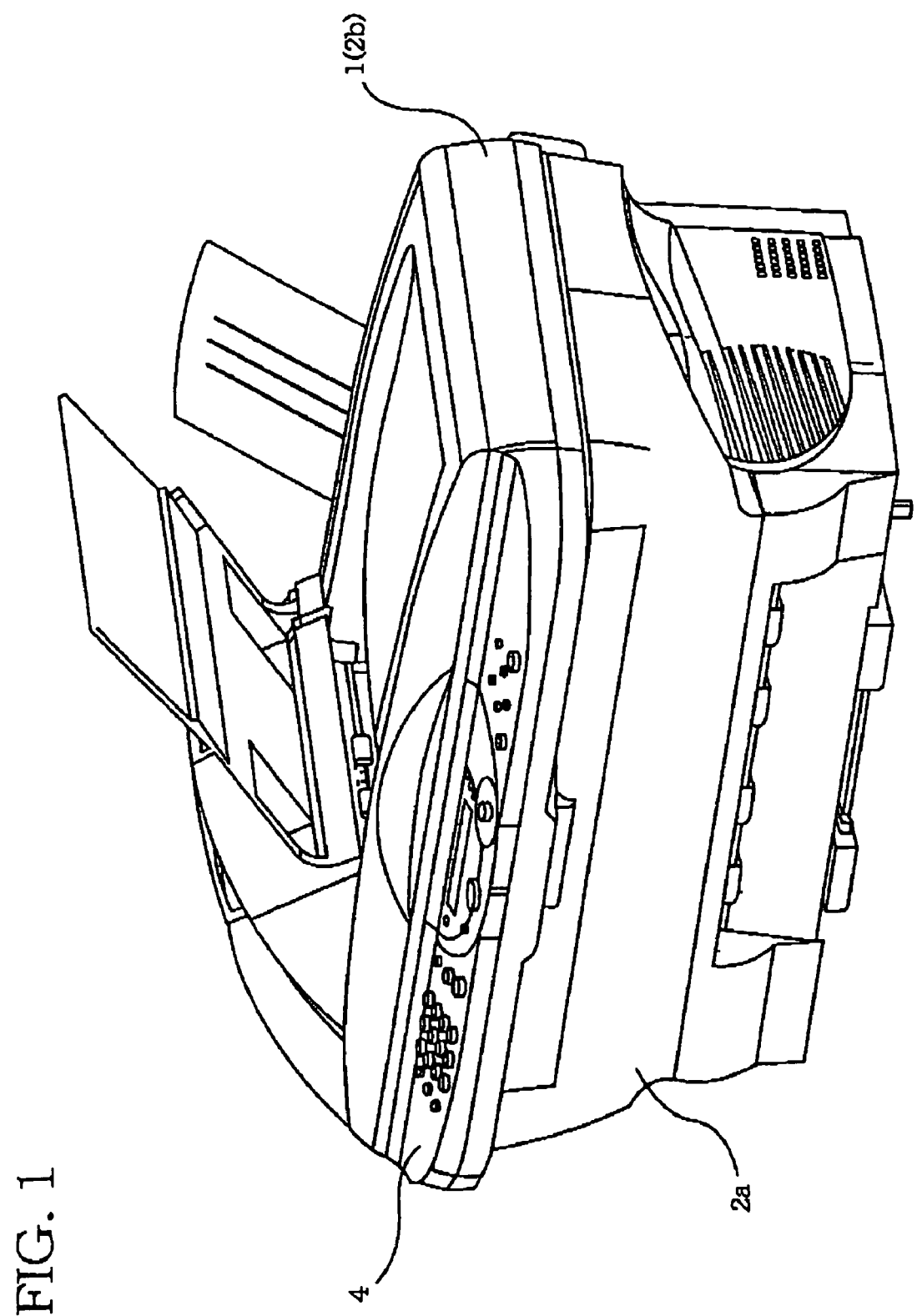
FIG. 1 is a perspective view of a multi-function apparatus constructed according to one embodiment of this invention.
Figure 2:
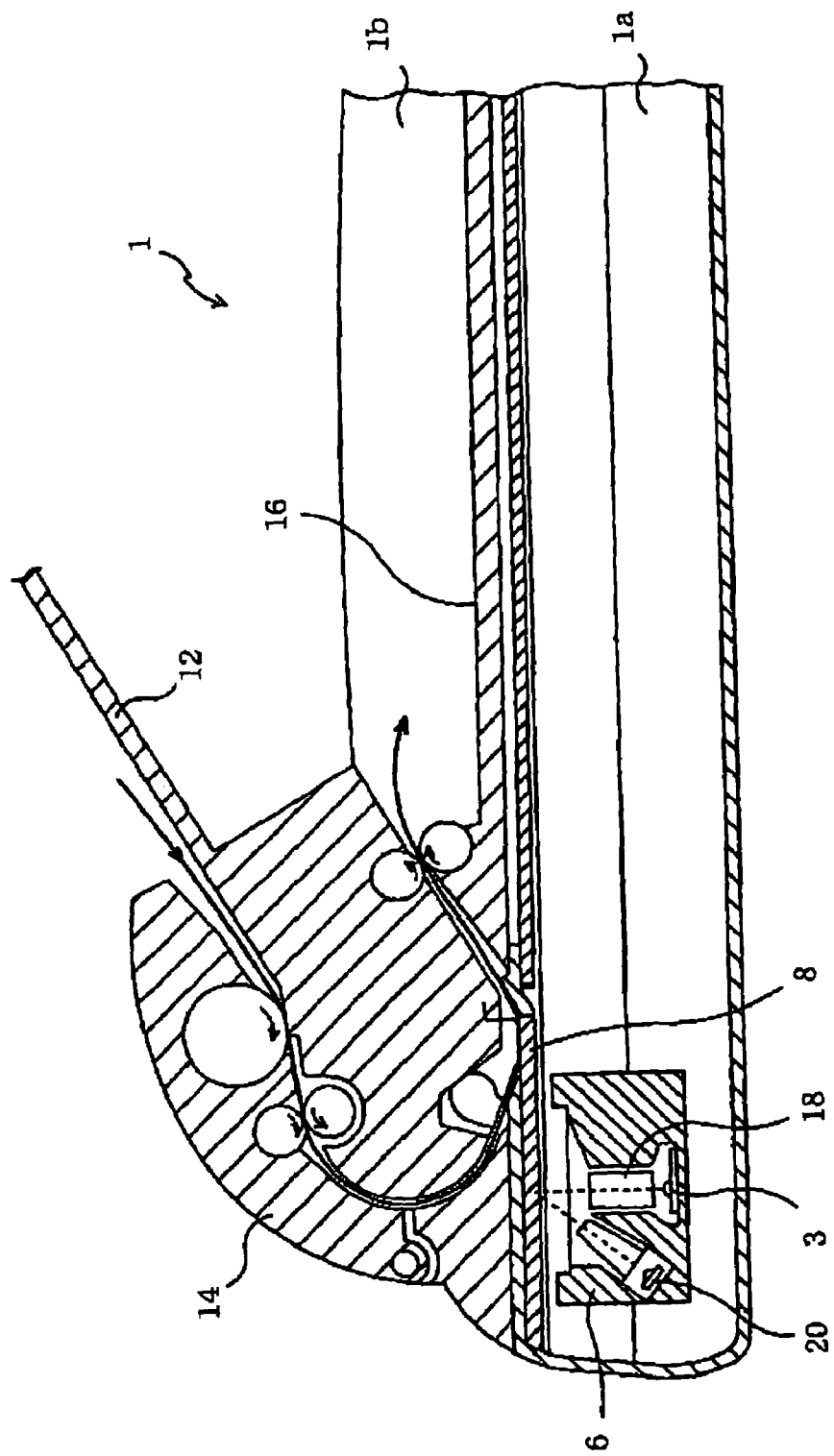
FIG. 2 is a fragmentary elevational view in cross section of the multi-function apparatus.

Referring to the accompanying drawings, there will be described an image sensor, an image reading device and an image resolution setting method according to some preferred embodiments of this invention. Reference is first made to FIGS. 1 and 2 showing an overall arrangement of a multi-function apparatus incorporating an image reading device 1 constructed according to the first embodiment of the present invention.

The multi-function apparatus is a clamshell type structure including a lower main body 2a and an upper main body 2b which is hinged to the lower main body 2a, so as to be opened and closed with respect to the lower main body 2a. The upper main body 2a is provided with the image reading device 1 indicated above. The upper main body 2a is further provided, on its front side, with an operator's control panel 4. While the present multi-function apparatus is also provided with an image forming device (in the form of a laser printer), a further description of this image forming device is deemed necessary, since understand of the image reading device is not necessary for understanding the present invention.

The image reading device 1 is also a clamshell type structure including a flat-bed portion 1a with a flat-bed mechanism (FB), and a cover portion 1b with an automatic document feeder mechanism (ADF), which is hinged to the flat-bed portion 1a, so as to be opened and closed with respect to the flat-bed portion 1a.

As shown in FIG. 2, the flat-bed portion 1a of the image reading device 1 includes a reading head (image sensor) 6, and a first platen glass 8, while the cover portion 1b includes an original supply tray 12, an original feed device 14, and an original eject tray 16.

The reading head 6 is provided with an array of light receiving elements 3, an array of self-focusing lenses 18 and an array of light sources 20. In operation of the reading head 6, local spots in a straight line on an original to be read are irradiated by respective radiations generated by the respective light sources 20, and components of the radiations which are reflected by the respective local spots are focused by the respective self-focusing lenses 18 on the respective light receiving elements 3, so that a line of image on the original is read by the light receiving elements 3 arranged in a straight line.

The heading head 6 is reciprocable in a right and left direction as seen in FIG. 2, by a suitable feeding device or mechanism, so that an image in the entire area of the original is readable by the reading head 6 during a movement of the reading head 6.

Figure 3:
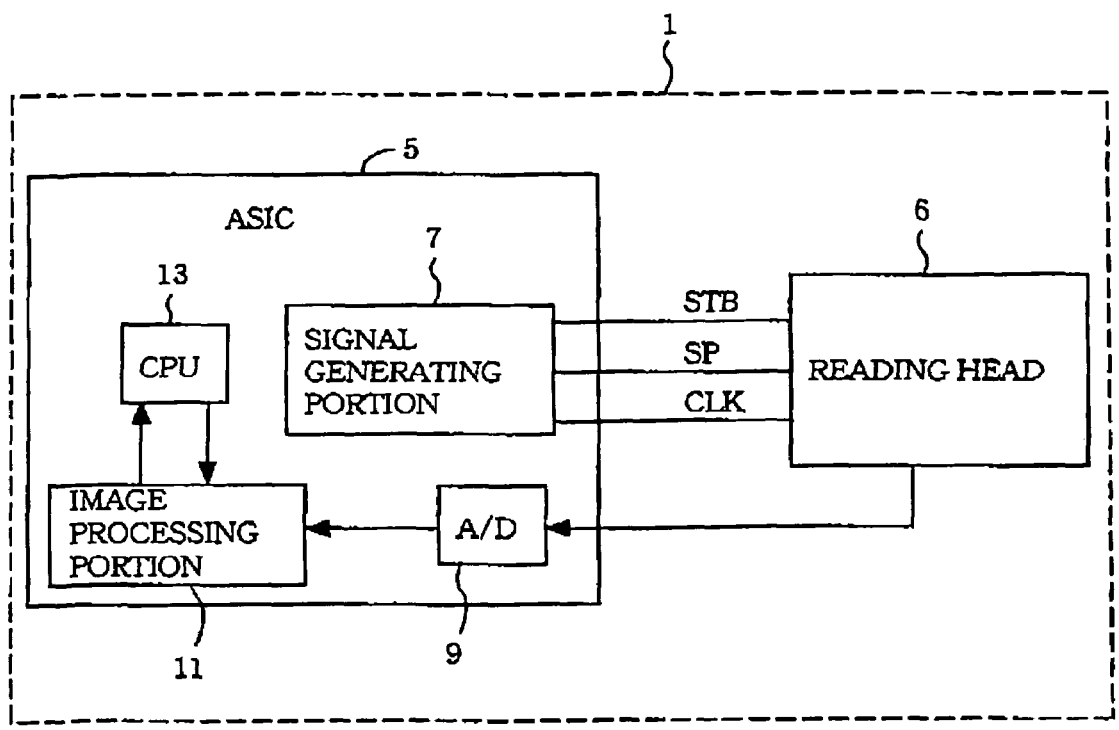
FIG. 3 is a block diagram illustrating an arrangement of an image reading device of the multi-function apparatus.

Referring further to FIG. 3, there will be described an arrangement of the image reading head 1. This image reading head 1 includes the above-indicated reading head or image sensor 6 (which will be described in detail), and a controller in the form of an ASIC 5 which is arranged to control the reading head 6 and process image signals received from the reading head 6. The ASIC 5 incorporates a signal generating portion 7 (serving as a resolution-setting-timing-signal generating portion, a first resolution-setting-signal generating portion, and a second resolution-setting-signal generating portion), an A/D converter portion 9, an image processing portion 11, and a CPU 13 (central processing unit serving as a control portion).

The signal generating portion 7 is arranged to generate a strobe signal STB (a control signal for setting the image resolution), a start signal SP, and a clock pulse signal CLK which are applied to the reading head 6. The A/D converter portion 9 is arranged to convert analog image signals received from the reading head 6, into digital signals to be applied to the image processing portion 11. The CPU 13 is arranged to control various portions of the ASIC 5.

Figure 4:
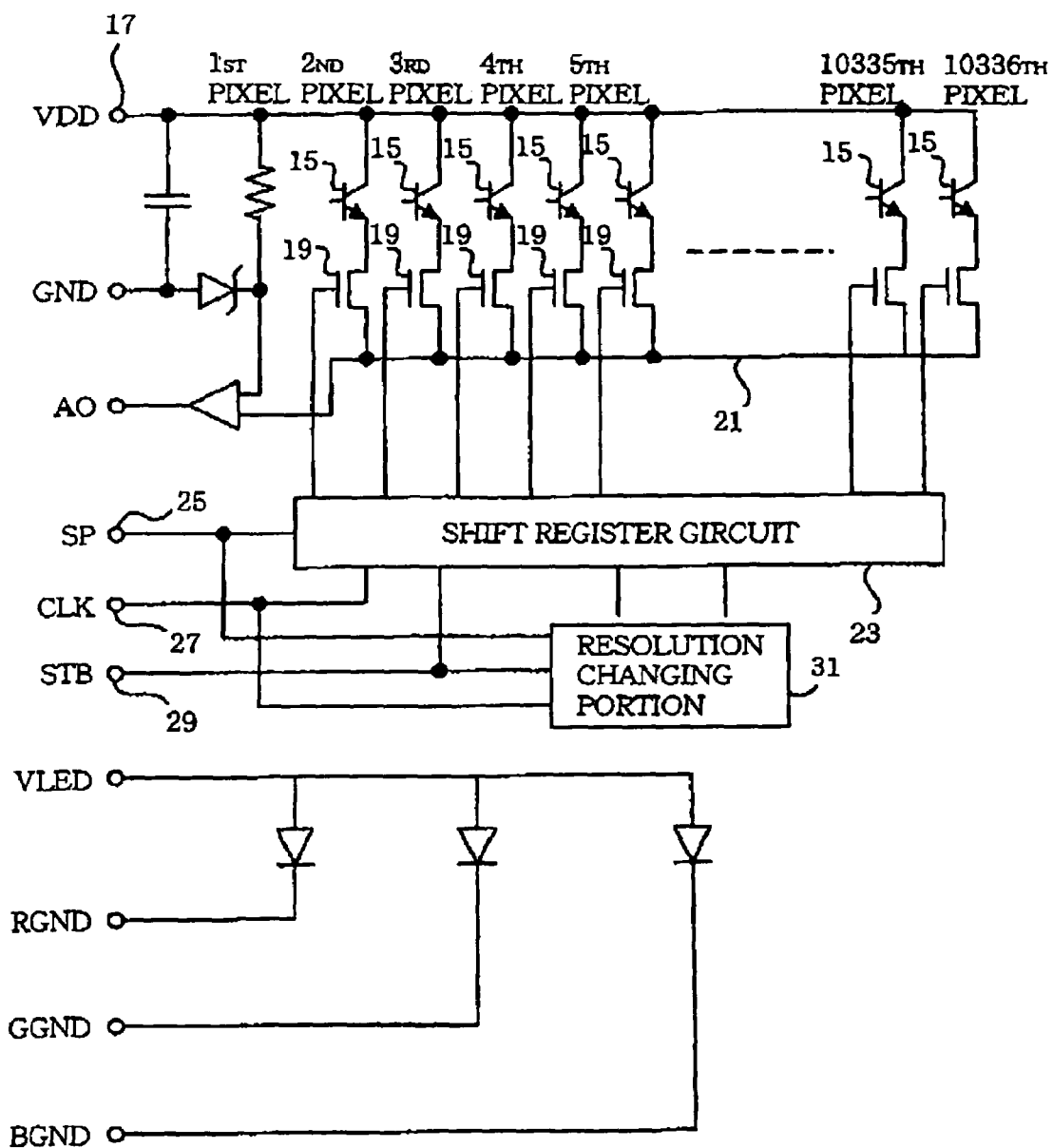
FIG. 4 is a view showing an arrangement of an image device of the multi-function apparatus.

The arrangement of the reading head 6 will be described by reference to FIGS. 3 and 4. In FIG. 4, reference numeral 15 represents photoelectric converter elements, each of which is constituted by a thin-film photo diode or a light conductive thin film. Described more specifically, 10336 photoelectric converter elements 15 are arranged along a straight line, with a density corresponding to 1200 dpi, so as to correspond to 10336 picture elements (pixels) that are identified by identification numbers from 1 through 10336. The photoelectric converter elements 15 are connected to a common electrode 17, so that a bias voltage $V_{DD}$ is applied to those elements 15.

Reference numeral 19 in FIG. 4 represents analog switches (serving as channel selector switches) each of which is selectively closed and opened to selectively connect and disconnect the output terminal (electric-charge output portion) of the corresponding photoelectric converter element 15 to and from an AO terminal 21 (signal output terminal).

Further, reference numeral 23 represents a shift register circuit which is operated in response to the start signal SP, to sequentially apply a signal to the gates of the analog switches 19 in synchronization of the clock pulse signal CLK, for turning on and off the analog switches 19. This shift register circuit 23 is further arranged to generate resolution setting data on the basis of signals received from a resolution changing portion 31 which will be described. On the generated resolution setting data, the shift register circuit 23 is placed in one of four operating modes corresponding to respective four values (1200 dpi, 600 dpi, 400 dpi and 300 dpi) of image resolution, so that an image on the original is read by the reading head 6 in the selected operating mode, that is, with the corresponding image resolution. The arrangement and operation of the shift register circuit 23 will be described in detail.

Reference numeral 25 represents an SP terminal through which a signal SP generated by the signal generating portion 7 of the ASIC 5 is applied to the shift register circuit 23 array and the resolution changing portion 31. Reference numeral 27 represents a CLK terminal through which the clock pulse signal CLK generated by the signal generating portion 7 of the ASIC 5 is applied to the shift register circuit 23 and the resolution changing portion 31.

Reference numeral 29 represents a STB terminal through which the strobe signal STB generated by the signal generating portion 7 of the ASIC 5 is applied to the shift register circuit 23 and the resolution changing portion 31. The resolution changing portion 31 indicated above serves as a resolution setting portion arranged to set the image resolution value of the reading head 6. Namely, the resolution changing portion 31 applies to the shift register circuit 23 a signal for selecting one of the four image resolution values 1200 dpi, 600 dpi, 400 dpi and 300 dpi. The arrangement and operation of the resolution changing portion 31 will be described in detail.

Figure 5:
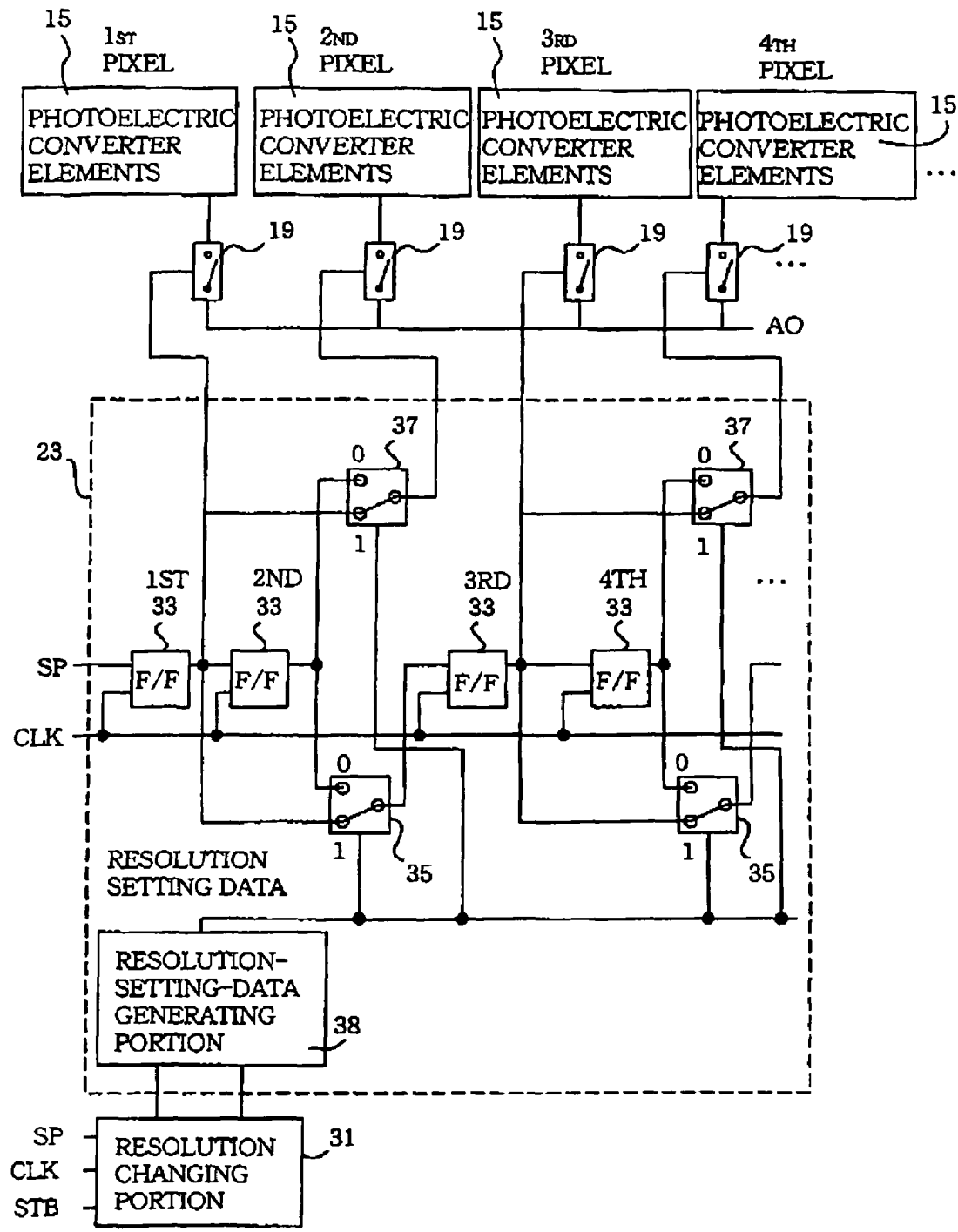
FIG. 5 is another view showing the arrangement of the image device.

Then, the arrangement of the shift register circuit 23 will be described referring to FIG. 5. In this figure, reference numeral 33 represents a plurality of shift registers in the form of flip-flops (F/F) provided for the respective photoelectric converter elements 15. Like the photoelectric converter elements 15, the flip-flops (F/F) 33 are identified by respective identification numbers from 1 through 10336. Each F/F 33 is supplied with the clock pulse signal CLK, and the start signal SP is initially applied to the first F/F 33 and then applied to the following F/F 33. Each F/F 33 is operated in response to the start signal SP, to hold the corresponding analog switch 19 in the closed state for a length of time corresponding to the period of the clock pulse signal CLK.

Reference numeral 35 represents changeover switches provided for the respective photoelectric converter elements 15 having the even identification numbers 2, 4, etc. When the changeover switches 35 receive the resolution setting data for selecting the image resolution value 1200 dpi from a resolution-setting-data generating portion 38 (which will be described), the contact of each changeover switch 35 is connected to a terminal "0", so that the second F/F 33 (having the identification number 2) is connected to the third F/F 33 (having the identification number 3), while the fourth F/F 33 (having the identification number 4) is connected to the fifth F/F 33 (having the identification number 5). Thus, each F/F 33 having an identification number $2n$ is connected to the F/F 33 having the next identification number ($2n+1$), where "n"=integers 1 through 5167. Further, each F/F 33 having an identification number ($2n-1$) and each F/F 33 having the next identification number $2n$ are always connected to each other. In this case, therefore, the adjacent ones of all the F/Fs 33 having the numbers 1 through 10336 are sequentially connected to each other.

When the changeover switches 35 receive the resolution setting data for selecting the image resolution value 600 dpi from the resolution-setting-data generating portion 38, the contact of each changeover switch 35 is connected to a terminal "1", so that each F/F 33 having an identification number ($2n-1$) is connected to the F/F 33 having an identification number ($2n+1$), while skipping the F/F having the intermediate identification number $2n$, whereby the first, third and fifth F/Fs 33 and other F/Fs 33 having the odd identification numbers are sequentially connected to each other.

Reference numeral 37 represents changeover switches also provided for the photoelectric converter elements 15 having the even identification numbers $2n$. When the changeover switches 37 receive the resolution setting data for selecting the image resolution value 1200 dpi from the resolution-setting-data generating portion 38, the contact of each changeover switch 37 is connected to a terminal "0", so that the second, fourth, sixth F/Fs and other F/Fs 33 having the even identification numbers are sequentially connected through the changeover switches 37 to the gates of the corresponding analog switches 19, while the first, third and fifth F/Fs 33 and other F/Fs 33 having the odd identification numbers are always connected to the gates of the corresponding analog switches 19. In this case, therefore, all of the F/Fs 33 having the identification numbers from 1 through 10336 are connected to the corresponding analog switches 19.

When the changeover switches 37 receive the resolution setting data for selecting the image resolution value 600 dpi from the resolution-setting-data generating portion 38, the contact of each changeover switch 37 is connected to a terminal "1", so that the first F/F 33 is connected to the gates of the first and second analog switches 19, while the third F/F 33 is connected to the third and fourth analog switches 19. Thus, each F/F 33 having an identification number $(2n-1)$ is connected to the gates of the two analog switches 19 having the identification numbers $(2n-1)$ and $2n$. Further, the F/F having the even identification numbers are not connected to the gate of any of the analog switches 19.

The shift register circuit 23 further includes changeover switches (not shown) arranged to connect the first, fourth and seventh F/Fs 33 and other F/Fs 33 having identification numbers $(3m-2)$ to each other, when these changeover switches receive the resolution setting data for selecting the image resolution value 400 dpi. The shift register circuit 23 further includes changeover switches (not shown) arranged to connect each F/F 33 having the identification number $(3m-2)$ to the two analog switches 19 having identification numbers $(3m-1)$ and $3m$, when these changeover switches receive the resolution setting data for selecting the image resolution value 400 dpi, where "m"=integers 1 through 3445.

The shift register circuit 28 further includes changeover switches (not shown) arranged to connected the first, fifth and ninth F/Fs 33 and other F/Fs having identification numbers $(4L-3)$ to each other, when these changeover switches receive the resolution setting data for selecting the image resolution value 300 dpi. The shift register circuit 23 further includes changeover switches (not shown) arranged to connect each F/F 33 having an identification number $(3L-3)$ to the two analog switches 19 having identification numbers $(4L-2)$ and $(4L-1)$, when these changeover switches receive the resolution setting data for selecting the image resolution value 300 dpi, where "L"=integers 1 through 2584.

Figure 6:
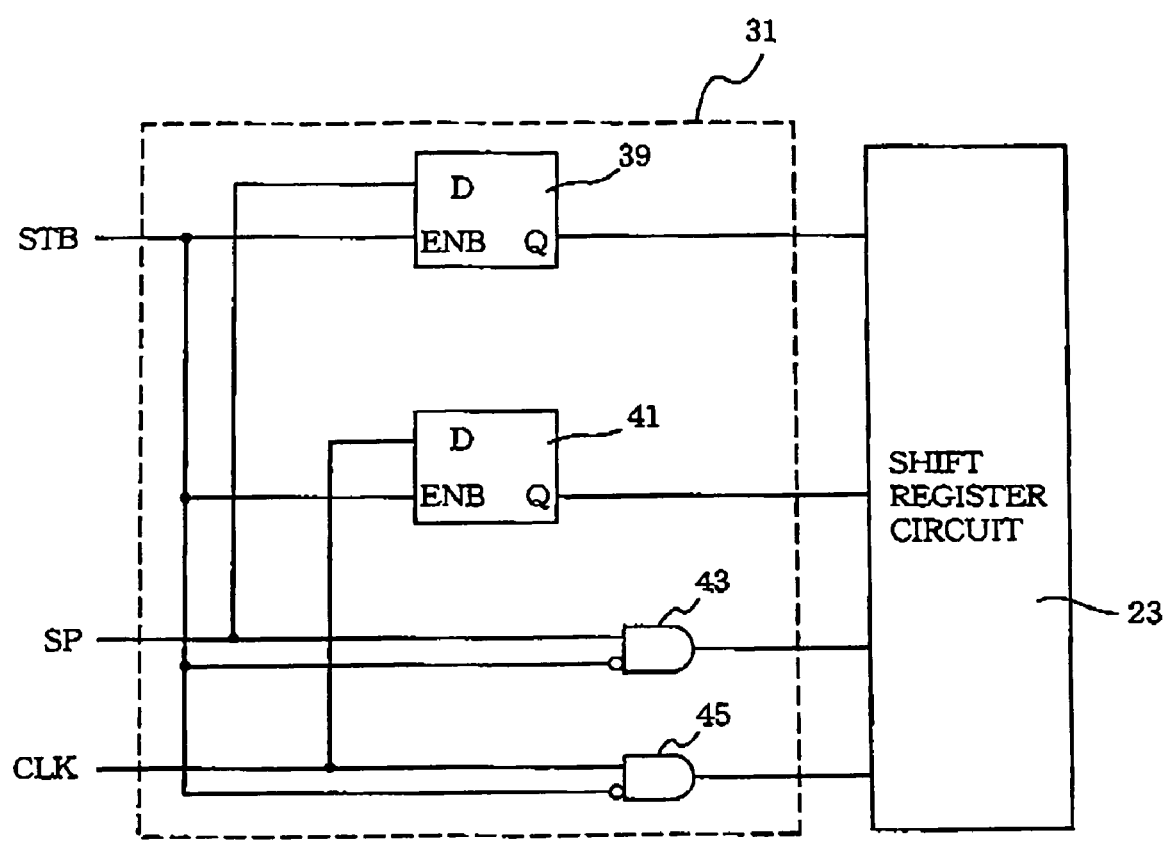
FIG. 6 is a block diagram illustrating an arrangement of an image resolution changing portion of the multi-function apparatus.

Referring further to FIG. 6, there will be described the arrangement of the resolution changing portion 31. This resolution changing portion 31 incorporates a latch 39, a latch 41, a switch 43 and a switch 45. The latch 39 is arranged to receive the strobe signal STB and the start signal SP, latch the start signal SP upon failing of the strobe signal STB, and apply the latched start signal SP to the resolution-setting-data generating portion 38 of the shift register 23 (FIG. 5).

The latch 41 is arranged to receive the strobe signal STB and the clock pulse signal CLK, latch the clock pulse signal CLK upon falling of the strobe signal STB, and apply the latched clock pulse signal CLK to the resolution-setting-data generating portion 38 of the shift register circuit 23.

The switch 43 is arranged not to apply the start signal SP to the shift register circuit 23 when the strobe signal STB is in the on state (high state), and apply the start signal SP to the shift register circuit 23 when the strobe signal has the low level (low state).

The switch 54 is arranged not to apply the clock pulse signal CLK to the shift register circuit 23 when the strobe signal is in the on state (high state), and apply the clock pulse signal CLK to the shift register circuit 23 when the strobe signal is in the off state (low state).

Figure 7A:
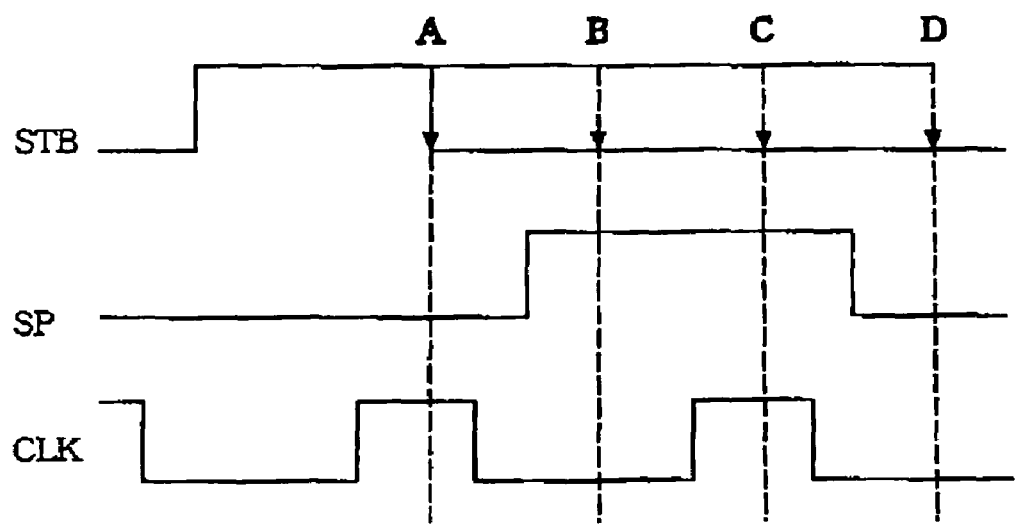
FIGS. 7A and 7B are views for explaining the waveforms of signals used for setting the image resolution in the multi-function apparatus.

There will next be described the operation of the image reading device 1 constructed according to the first embodiment. When the operation is initiated, the image resolution value is first set (in the resolution setting method according to the invention). Namely, the CPU 13 of the ASIC 5 controls the signal generating portion 7 (FIG. 3), to generate the strobe signal STB, the start signal SP and the clock pulse signal CLK, as indicated in FIG. 7A. It will be understood that the strobe signal STB serves as a resolution setting timing signal, and the start signal SP serves as a first resolution setting signal, while the clock pulse signal CLK serves as a second resolution setting signal.

As indicated in FIG. 7A, there are four timings A, B, C and D of falling of the strobe signal STB, which correspond to respective four different combinations of the on and off states (high and low levels) of the start signal SP and the clock pulse signal CLK upon falling of the strobe signal STB. When the strobe signal STB falls at the timing A, the start signal SP is in the off state, so that the latch 39 of the resolution changing portion 31 (FIG. 6) is placed in the off state or logical "0" state, while the clock pulse signal CLK is in the high state, so that the latch 41 is placed in the on state or logical "1" state.

When the strobe signal STB falls at the timing B, the start signal SP is in the on state, so that the latch 39 of the resolution changing portion 31 is placed in the on state or logical "1" state, while the clock pulse signal CLK is in the off state, so that the latch 41 is placed in the off state or logical "0" state. When the strobe signal STB falls at the timing C, the start signal SP is in the on state, so that the latch 39 of the resolution changing portion 31 is placed in the on state or logical "1" state, while the clock pulse signal CLK is in the on state, so that the latch 41 is placed in the on state or logical "1" state.

When the strobe signal STB falls at the timing D, the start signal SP is in the off state, so that the latch 39 of the resolution changing portion 31 is placed in the off state or logical "0" state, while the clock pulse signal CLK is in the off state, so that the latch 41 is placed in the off state or logical "0" state. Thus, there are four combinations of the operating states of the two latches 39 and 41 of the resolution changing portion 31, which correspond to the respective four timings A, B, C and D of falling of the strobe signal STB generated by the signal generating portion 7, as indicated in TABLE 1 given below.

TABLE 1

| TIMING OF FALL OF SIGNAL STB | STATE OF LATCH 39 | STATE OF LATCH 41 | RESOLUTION (dpi) |
| --- | --- | --- | --- |
| A | 0 | 1 | 1200 |
| B | 1 | 0 | 600 |
| C | 1 | 1 | 400 |
| D | 0 | 0 | 300 |

The resolution-setting-data generating portion 38 of the shift register circuit 23 is connected to the latches 39 and 40 of the resolution changing portion 31, and is arranged to generate one of four kinds of resolution setting data which corresponds to one of the four combinations of the operating states of the two latches 39, 41. Described more specifically, when the latches 39 and 41 are placed in the logical "0" and "1" states, respectively, the resolution-setting-data generating portion 38 generates the resolution setting data for selecting the image resolution of 1200 dpi. When the latches 39, 41 are placed in the logical "1" and "0" states, respectively, the resolution-setting-data generating portion 38 generates the resolution setting data for selecting the image resolution value of 600 dpi. When the latches 39, 41 are both placed in the logical "1" state, the resolution-setting-data generating portion 38 generates the resolution setting data for selecting the image resolution value of 400 dpi. When the latches 39, 41 are both placed in the logical "0" state, the resolution-setting-data generating portion 38 generates the resolution setting data for selecting the image resolution of 300 dpi.

In summary, the signal generating portion 7 of the ASIC 5 generates the strobe signal STB such that the generated strobe signal STB falls at a selected one of the four timings A-D indicated in FIG. 7A, and the two latches 39 and 41 of the resolution changing portion 31 are placed in one of the four combinations of the operating states, which corresponds to the selected timing of fall of the strobe signal STB. According to the specific combination of the operating states of the latches 39, 41, the resolution-setting-data generating portion 38 of the shift register circuit 23 generates the resolution setting data corresponding to the above-indicted specific combination of the operating states of the latches 39, 41. In the present embodiment, therefore, the resolution setting data generated by the resolution-setting-data generating portion 38 are determined depending upon the waveform of the strobe signal STB generated by the signal generating portion 7.

Figure 7B:
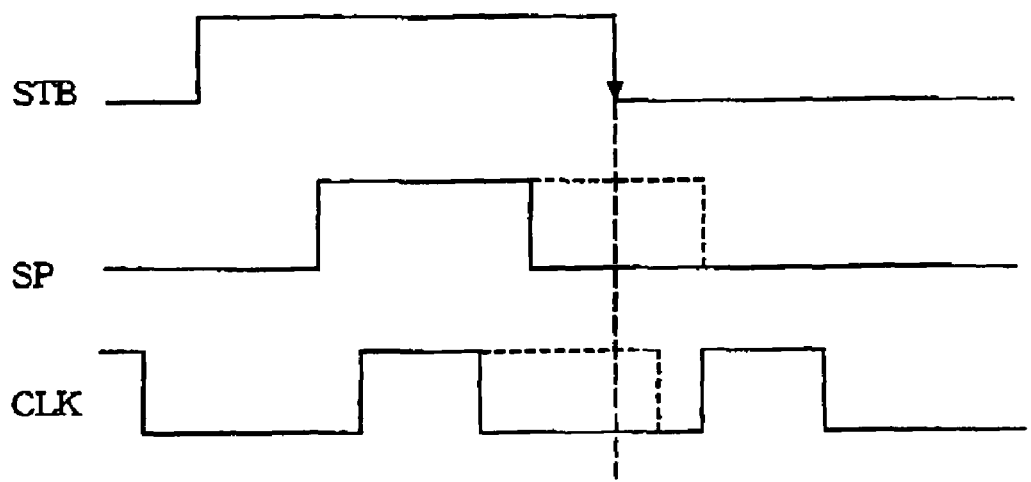

The signal generating portion 7 may be modified such that the strobe signal STB has the constant fall timing, and the fall timings of the start signal SP and the clock pulse signal CLK with respect to the fall timing of the strobe signal STB are changed, as indicated in FIG. 7B, to change the image resolution value in four steps corresponding to four combinations of the fall timings of the signals SP and CLK with respect to the fall timing of the strobe signal STB. That is, the four combinations of the two latches 39 and 41 corresponding to the respective four image resolution values correspond to the respective four combinations of the fall timing of the two signals SP and CLK.

In the embodiment of FIGS. 6 and 7, the latches 39 and 41 are arranged to latch the start signal SP and the clock pulse signal CLK when the strobe signal STB falls at one of the four different timings. However, the latches 39, 41 may be arranged to latch the start and clock pulse signals SP, CLK when the strobe signal STB rises at one of four different timings. Further, the latches 39, 41 may be modified to latch the strobe signal STB and the clock pulse signal CLK when the start signal SP rises or falls, or alternatively latch the strobe signal STB and the start signal SP when the clock pulse signal CLK rises or falls.

The switches 43 and 46 (FIG. 6) of the resolution changing portion 31 are held in the closed state until the strobe signal STB falls, that is, until the image resolution has been set. Namely, the start signal SP and the clock pulse signal CLK are not applied to the shift register circuit 23, and the shift register circuit 23 is not started, until the image resolution has been set. When the image resolution has been set, that is, when the strobe signal STB has fallen, the switches 43, 45 are opened, so that the start signal SP and the clock pulse signal CLK are applicable to the shift register circuit 23. At this time, the CPU 13 commands the signal generating portion 7 to generate the start signal SP, so that the operation of the shift register circuit 23 is started in response to the generated start signal SP.

The shift register circuit 23 controls the analog switches 19 in a predetermined on-off control pattern determined by the resolution setting data generated by the resolution-setting-data generating portion 38 in response to the signals of the resolution changing portion 31, so that the image reading device 1 is operated to read an image with the thus determined image resolution. Referring to FIG. 5, there will first be described the on-off control pattern in which the analog switches 19 are selectively turned on and off (closed and opened) by the shift register circuit 23 when the generated resolution setting data represent the image resolution value of 1200 dpi.

When the image resolution value of 1200 dpi is selected, the contact of each changeover switch 35 is connected to the terminal "0", so that the adjacent ones of all the F/Fs 33 having the identification numbers 1 through 10336 are connected in series with each other, while the contact of each changeover switch 37 is connected to the terminal "0". In this state, all of the F/Fs 33 having the identification numbers 1 through 10336 are connected to the gates of the analog switches 19 having the corresponding identification numbers.

When the start signal SP is applied to the first F/F 33 in the above-described state, the first analog switch 19 is held in the closed state for the length of time corresponding to the period of the clock pulse signal CLK, so that the corresponding electric charge stored in the photoelectric converter element 15 is fed to the AO terminal 21. The start signal SP initially applied to the first F/F 33 is sequentially transferred to the second, third, fourth and the following F/Fs 33, in synchronization with the clock pulse signal CLK. Upon reception of the start signal SP, each F/F 33 holds the corresponding analog switch 19 in the closed state for the length of time corresponding to the period of the clock pulse signal CLK, so that the electric charges stored in the photoelectric converter elements 15 having the identification numbers 1 through 10336 are discharged one after another to the AO terminal 21. The electric charge feed to the AO terminal 21 is fed, as an image signal, to the A/D converter portion 9 of the ASIC 5. Thus, the reading of a line of image on the original is completed when the electric charge is discharged from the last photoelectric converter element 15 having the identification number 10336.

After the reading of the first line of image is completed, the reading of the second line of image is initiated with the setting of the image resolution by generation of the resolution setting data, which is followed by the same operation of the shift register circuit 23 as described above with respect to the first line of image. The third and the following lines of image are read in the same manner.

Image data obtained for each line of image are followed by image resolution data which are generated by resolution-data generating means (not shown), on the basis of the operating states of the latches 39, 41 of the resolution changing portion 31. The image resolution data represent the image resolution value set for the line of image in question.

When the image resolution value of 1200 dpi is selected by the resolution setting data generated by the resolution-setting-data generating portion 38 in response to the signals of the resolution changing portion 31, the electric charges are sequentially discharged from all of the photoelectric converter elements 15, independently of each other, as described above, so that the image signals generated by the reading head 6 represent an image having the resolution value of 1200 dpi.

There will next be described the on-off control pattern in which the analog switches 19 are turned on and off (closed and opened) by the shift register circuit 23 when the generated resolution setting data represent the image resolution value of 600 dpi.

In this case, the contact of each changeover switch 35 is connected to the terminal "1", so that the first, third, fifth and other F/Fs 33 having the odd identification numbers 1, 3, 5, etc. are connected to each other, while the contact of each changeover switch 37 is connected to the terminal "1", so that the first F/F 33 is connected to the gates of the first and second analog switches 19, while the third F/F 33 is connected to the gates of the third and fourth analog switches 19. Similarly, each of the other F/Fs 33 having the identification numbers ($2n-1$) is connected to the two analog switches 19 having the identification numbers ($2n-1$) and $2n$. However, the F/Fs 33 having the even identification numbers are not connected to the gages of any analog switches 19.

When the start signal SP is applied to the first F/F 33 in the above-described state, the first analog switch 19 is held in the closed state for the length of time corresponding to the period of the clock pulse signal CLK, while at the same time the second analog switch 19 connected to the first F/F 33 through the changeover switch 37 the contact of which is connected to the terminal "1" is also held in the closed state for the length of time corresponding to the period of the clock pulse signal CLK. As a result, the electric charges stored in the first and second photoelectric converter elements 15 are simultaneously fed to the AO terminal 21.

The start signal SP initially applied to the first F/F 33 is sequentially fed to the third, fifth and other F/Fs 33 having the odd identification numbers ($2n-1$) . . . 10335, through the changeover switches 35 (the contacts of which are connected to the terminal "1"), in synchronization with the clock pulse signal. Upon reception of the start signal SP, each F/F 33 having the odd identification number holds the analog switch 19 having the same identification number and the next analog switch 19, for the length of time corresponding to the period of the clock pulse signal CLK. Accordingly, each time the start signal SP is received by each F/F 33 having the odd identification number, the electric charge stored in the photoelectric converter element 15 having the same identification number and the electric charge stored in the next photoelectric converter element 19 are simultaneously fed to the AO terminal 21. The electric charges fed to the AO terminal 21 are fed, as image signals, to the A/D converter portion 9 of the ASIC 5. The reading of one line of image is completed when the electric charge is discharged from the last photoelectric converter element 15 having the identification number 10336. The reading of each of the following lines of image is implemented with the setting of the image resolution by generation of the resolution setting data, and the operation of the shift register circuit 23 as described above with respect to the first line of image. As in the case of reading with the image resolution value of 1200 dpi, the image data obtained for each line of image are followed by the image resolution data generated by the resolution-data generating means (not shown).

As described above, the electric charges are simultaneously discharged from the two adjacent photoelectric converter elements 15 when the resolution setting data for selecting the image resolution value of 600 dpi are generated by the resolution-setting-data generating portion 38 in response to the signals of the resolution changing portion 31, so that the image is read with the resolution value of 600 dpi.

There will next be briefly described the on-off control pattern in which the analog switches 19 are turned on and off (closed and opened) by the shift register circuit 23 when the generated resolution setting data represent the image resolution value of 400 dpi.

In this case, the first, fourth, seventh and other F/Fs 33 having the identification numbers ($3m-2$) are connected to each other, where "m"=integers 1 through 3445. In this state, each F/F 33 having the identification number ($3m-2$) is connected to the three adjacent analog switches 19 having the identification numbers ($3m-2$), ($3m-1$) and $3m$.

When the start signal SP is applied to the first F/F 33 in the above-described state, the first, second and third analog switches 19 are held in the closed state for the length of time corresponding to the period of the clock pulse signal CLK. As a result, the electric charges stored in the first, second and third photoelectric converter elements 15 are simultaneously fed to the AO terminal 21.

The start signal SP initially applied to the first F/F 33 is sequentially fed to the fourth, seventh and other F/Fs 33 having the identification numbers ($3m-2$), through the changeover switches 35 (the contacts of which are connected to the terminal "1"), in synchronization with the clock pulse signal CLK. Upon reception of the start signal SP, each F/F 33 having the identification number ($3m-2$) holds the three adjacent analog switches 19 having the identification numbers ($3m-2$), ($3m-1$) and $3m$, for the length of time corresponding to the period of the clock pulse signal CLK. Accordingly, each time the start signal SP is received by each F/F 33 having the identification number ($3m-2$), the electric charge stored in the three adjacent photoelectric converter elements 15 having the identification numbers ($3m-2$), ($3m-1$) and $3m$ are simultaneously fed to the AO terminal 21. The electric charges fed to the AO terminal 21 are fed, as image signals, to the A/D converter portion 9 of the ASIC 5. The reading of one line of image is completed when the electric charge is discharged from the last photoelectric converter element 15 having the identification number 10336. The reading of each of the following lines of image is implemented with the setting of the image resolution by generation of the resolution setting data, and the operation of the shift register circuit 23 as described above with respect to the first line of image. As in the case of reading with the image resolution value of 1200 dpi, the image data obtained for each line of image are followed by the image resolution data generated by the resolution-data generating means (not shown).

As described above, the electric charges are simultaneously discharged from the three adjacent photoelectric converter elements 15 when the resolution setting data for selecting the image resolution value of 400 dpi are generated by the resolution-setting-data generating portion 38 in response to the signals of the resolution changing portion 31, so that the image is read with the resolution value of 400 dpi.

There will next be briefly described the on-off control pattern in which the analog switches 19 are turned on and off (closed and opened) by the shift register circuit 23 when the generated resolution setting data represent the image resolution value of 300 dpi.

In this case, the first, fifth, ninth and other F/Fs 33 having the identification numbers ($4L-3$) are connected to each other, where "L"=integers 1 through 32584. In this state, each F/F 33 having the identification number ($4L-3$) is connected to the four adjacent analog switches 19 having the identification numbers ($4L-3$), ($4L-2$), ($4L-1$) and $4L$.

When the start signal SP is applied to the first F/F 33 in the above-described state, the first through fourth analog switches 19 are held in the closed state for the length of time corresponding to the period of the clock pulse signal CLK. As a result, the electric charges stored in the first through fourth photoelectric converter elements 15 are simultaneously fed to the AO terminal 21.

The start signal SP initially applied to the first F/F 33 is sequentially fed to the fifth, ninth and other F/Fs 33 having the identification numbers ($4L-3$), in synchronization with the clock pulse signal CLK. Upon reception of the start signal SP, each F/F 38 having the identification number ($4L-3$) holds the four adjacent analog switches 19 having the identification numbers ($4L-3$), ($4L-2$), ($4L-1$) and $4L$, for the length of time corresponding to the period of the clock pulse signal CLK. Accordingly, each time the start signal SP is received by each F/F 33 having the identification number ($4L-3$), the electric charge stored in the four adjacent photoelectric converter elements 15 having the identification numbers (4L−3), (4L−2), (4L−1) and 4L are simultaneously fed to the AO terminal 21. The electric charges fed to the AO terminal 21 are fed, as image signals, to the A/D converter portion 9 of the ASIC 5. The reading of one line of image is completed when the electric charge is discharged from the last photoelectric converter element 15 having the identification number 10336. The reading of each of the following lines of image is implemented with the setting of the image resolution by generation of the resolution setting data, and the operation of the shift register circuit 23 as described above with respect to the first line of image. As in the case of reading with the image resolution value of 1200 dpi, the image data obtained for each line of image are followed by the image resolution data generated by the resolution-data generating means (not shown).

As described above, the electric charges are simultaneously discharged from the four adjacent photoelectric converter elements 15 when the resolution setting data for selecting the image resolution value of 300 dpi are generated by the resolution-setting-data generating portion 38 in response to the signals of the resolution changing portion 31, so that the image is read with the resolution value of 300 dpi.

In the embodiment described above, the resolution setting data are generated for each line of image to be read. However, the resolution setting data may be generated only once for all lines of image in the entire area of the original (only once for each page). In this case, the shift register circuit 23 is held operated in the same image resolution mode corresponding to the image resolution value set by the generated resolution setting data.

The ASIC 5 is arranged to determine whether the image data received from the reading head 6 represent the image read with the resolution value set by the ASIC 5, more precisely, whether the image resolution value represented by the waveform of the strobe signal STB generated by the signal generating portion 7 coincides with the image resolution value represented by the image resolution data following the received image data.

Where the image resolution value represented by the image resolution data following the image data received from the reading head 6 is the same as set by the ASIC 5, the image data are processed in a normal manner. Where the image resolution value represented by the image resolution data is different from the image resolution value set by the ASIC 5, the ASIC 5 activates an alarm indicator or a display to provide a suitable warning signal or commands the reading head 6 to cease the reading operation.

There will be described advantages of the image reading device 1 constructed according to the first embodiment described above, the reading head 6 incorporated in the device 1, and the resolution setting method practiced by the device 1.

The image reading device 1 according to the first embodiment is capable of selecting one of the four image resolution values of 1200 dpi, 600 dpi, 400 dpi and 300 dpi, in a simple manner on the basis of only three signals, namely, strobe signal STB, start signal SP and clock pulse signal CLK.

In the first embodiment, the switch 43 (FIG. 6) prevents the start signal ST from being applied to the shift register circuit 23 until the strobe signal STB used for setting the image resolution falls. The shift register circuit 23 is started in response to the start signal SP applied thereto after falling of the strobe signal STB. Accordingly, the start signal SP is prevented from starting the shift register circuit 23, even if the timing of rise of the start signal SP used as the first resolution setting signal varies depending upon the image resolution value set by the ASIC 5. Thus, the variation in the timing of rise of the start signal SP does not cause a fluctuation in the timing at which the image reading operation is started.

The first embodiment may be arranged to set the image resolution value for each line of image to be read. In this case, the image reading device 1 can be easily controlled by repeatedly executing a stored control program formulated to perform a series of operations to set the image resolution for each line of image and read this line of image.

Further, the first embodiment may be arranged to set the image resolution for each page of image. In this case, the required frequency of setting of the image resolution is reduced, with a result of reducing the time required for reading the desired image.

In the first embodiment, the shift register circuit 23 is arranged to simultaneously close or turn on the adjacent two, three or four analog switches 19 when the image resolution values 600 dpi, 400 dpi and 300 dpi (which are other than the maximum image resolution value 1200 dpi) are respectively selected according to the generated resolution setting data. In these cases, the electric signals are simultaneously fed from the plurality of photoelectric converter elements 15 to the image signal line.

In the case of selection of one of the image resolution values of 600 dpi, 400 dpi and 300 dpi, the cycle time during which the optical signal is received by each photoelectric converter element 15 and the electric signal is generated from the converter element 15 is shortened, and the level of the electric signal generated by each converter element 15 is accordingly reduced. However, the above-described arrangement of the shift register circuit 23 prevents a decrease in the output of the signal line and assures a relatively high S/N ratio of the image signal, even when the relatively low image resolution value is selected. Further, the entire image can be read with high efficiency when the relatively low image resolution value is selected. In this respect, it is noted that the shift register circuit 23 is arranged to turn on successive groups of the above-indicated adjacent channel selector switches, in synchronization with respective pulses of the clock pulse signal CLK. Further, the feeding device to feed the reading head 6 (image sensor) is arranged to feed the reading head 6 relative to the original carrying an image to be read, at a speed which increases with an increase in the number of the adjacent channel selector switches to be simultaneously turned on. In other words, the start signal to start the reading of each line of image is generated at a frequency which increases with an increase in the number of the adjacent channel selector switches to be simultaneously turned on.

In the illustrated embodiment, image data (image signals) representing each line of image are followed by image resolution data (image resolution signal) indicative of the image resolution value with which the line of image was read. Accordingly, the ASIC 5 can confirm that the image resolution has been correctly set by the image sensor or reading head 6. If the image resolution has not been correctly set by the reading head 6, the ASIC 5 may activate an alarm indicator or a display of the image reading device 1 to provide a suitable warning signal or commands the reading head 6 to cease the image reading operation.

Figure 8:
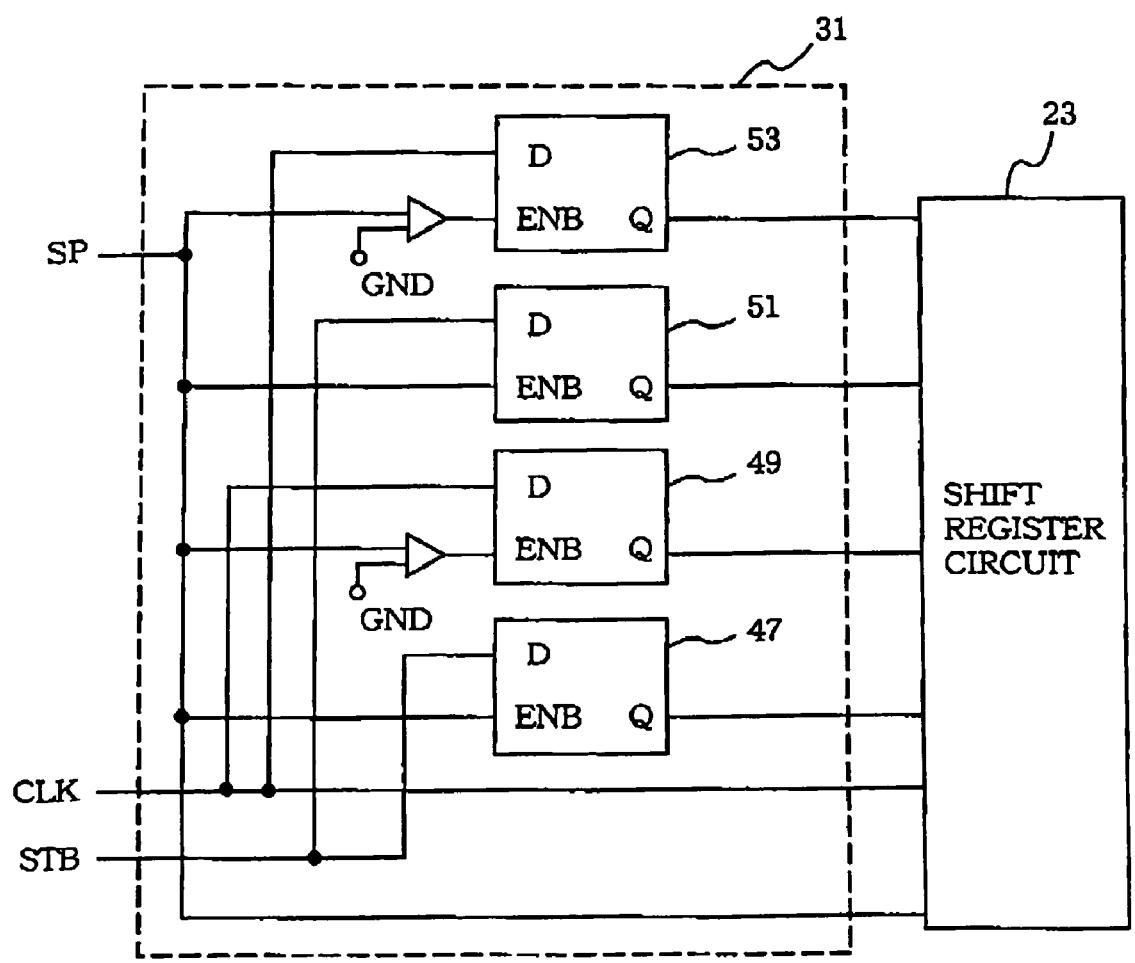
FIG. 8 is a block diagram illustrating an arrangement of an image resolution changing portion of a multi-function apparatus constructed according to another embodiment of this invention.

Referring next to FIGS. 8 and 8, there will be described an image reading device according to a second embodiment of this invention, which is basically identical with that of the first embodiment. The second embodiment is different from the first embodiment, only in the arrangement of the resolution changing portion 31. As shown in FIG. 8, the resolution changing portion 31 used in the second embodiment incorporates four latches 47, 49, 51 and 53.

Figure 9:
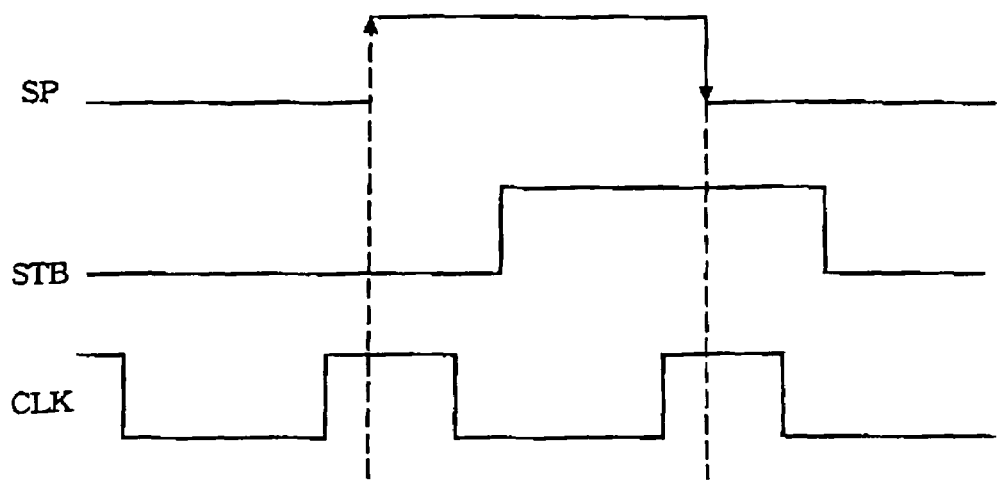
FIG. 9 is a view for explaining the waveforms of signals used for setting the image resolution in the multi-function apparatus of FIG. 8.

The resolution changing portion 31 is arranged to receive the start signal SP (resolution setting timing signal), the strobe signal STB (first resolution setting signal) and the dock pulse signal CLK (second resolution setting signal), which are indicated in FIG. 9. The latch 47 is placed in the logical "1" or "0" state depending upon whether the strobe signal STB is in the on or off state (high or low state) upon rising of the start signal SP. The latch 49 is placed in the logical "1" or "0"0 state depending upon whether the clock pulse signal CLK is in the on or off state upon rising of the start signal SP. The latch 51 is placed in the logical "1" or "0" state depending upon whether the strobe signal STB in the on or off state upon falling of the start signal SP. The latch 53 is placed in the logical "1" or "0" state depending upon whether the clock pulse signal CLK is in the on or off state upon falling of the start signal SP.

There are 16 combinations of the operating states of the four latches 47, 49, 51, 53, as indicated in TABLE 2 given below. One of those 16 combinations is selected by the signal generating portion 7, by changing the timings of rise and fall of the start signal SP, or by changing the waveforms or the timings of rise and fall of the strobe signal STB and the clock pulse signal CLK, so as to change the on/off states (high/low levels) of the strobe signal STB and the clock pulse signal CLK upon rising and falling of the start signal SP.

TABLE 2

| LATCH 47 | LATCH 49 | LATCH 51 | LATCH 53 |
|---|---|---|---|
| 0 | 0 | 0 | 0 |
| 1 | 0 | 0 | 0 |
| 0 | 1 | 0 | 0 |
| 0 | 0 | 1 | 0 |
| 0 | 0 | 0 | 1 |
| 1 | 1 | 0 | 0 |
| 0 | 1 | 1 | 0 |
| 0 | 0 | 1 | 1 |
| 1 | 0 | 0 | 1 |
| 1 | 0 | 1 | 0 |
| 0 | 1 | 0 | 1 |
| 1 | 1 | 1 | 0 |
| 0 | 1 | 1 | 1 |
| 1 | 0 | 1 | 1 |
| 1 | 1 | 0 | 1 |
| 1 | 1 | 1 | 1 |

The resolution-setting-data generating portion 38 is arranged to generate one of 16 kinds of resolution setting data, depending upon the presently established combination of the operating states of the four latches 47, 49, 51 and 53. In the present second embodiment, therefore, a total of 16 image resolution values are selectively available by changing the waveforms of the signals SP, STB, CLK, or the timings of rise and fall of those signals.

On the basis of the resolution setting data thus generated by the resolution-setting-data generating portion 38, the shift register circuit 23 controls the analog switches 19 in the corresponding on-off patterns, so that the reading head 6 of the image reading device 1 is operated to read the image with the resolution value represented by the generated resolution setting data.

Described more specifically, the shift register circuit 23 incorporates changeover switches (corresponding to the changeover switches 35 provided in the first embodiment) for connecting the selected F/Fs 33 to each other, according to the generated one of the 16 different kinds of resolution setting data, and further incorporates changeover switches (corresponding to the changeover switches 37 provided in the first embodiment) for closing the selected analog switches 19 for each F/F 33.

Thus, the image reading device 1 according to the present second embodiment is arranged to selectively generate one of the 16 kinds of resolution setting data on the basis of the three signals SP, STB, CLK generated by the signal generating portion 7, so that the analog switches 19 are closed and opened by the shift register circuit 23 in the predetermined on-off control pattern determined by the generated resolution setting data, whereby the image resolution of the reading head 6 of the image reading device 1 is selected from among the 16 different values.

Figure 10:
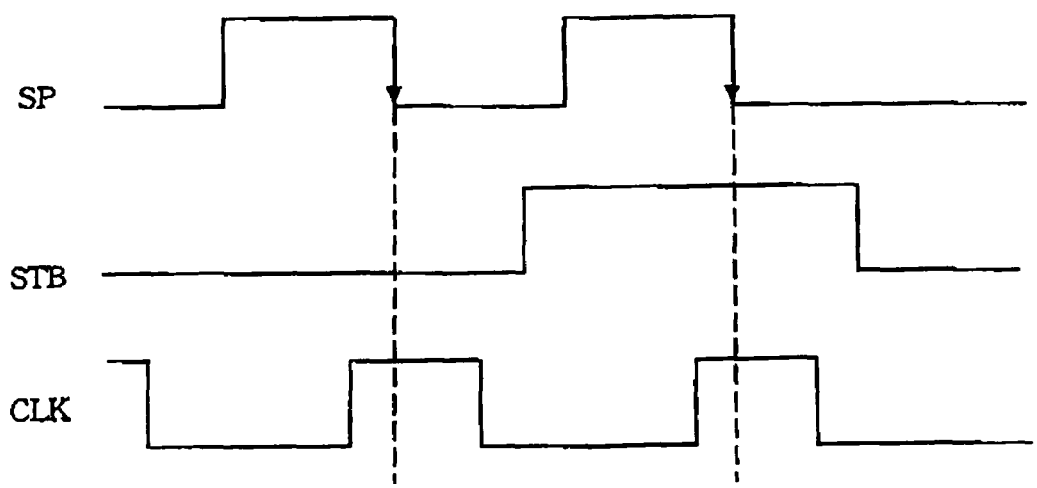
FIG. 10 is a view for explaining the waveforms of signals used for setting the image resolution in a multi-function apparatus according to a further embodiment of the invention.
Figure 11:
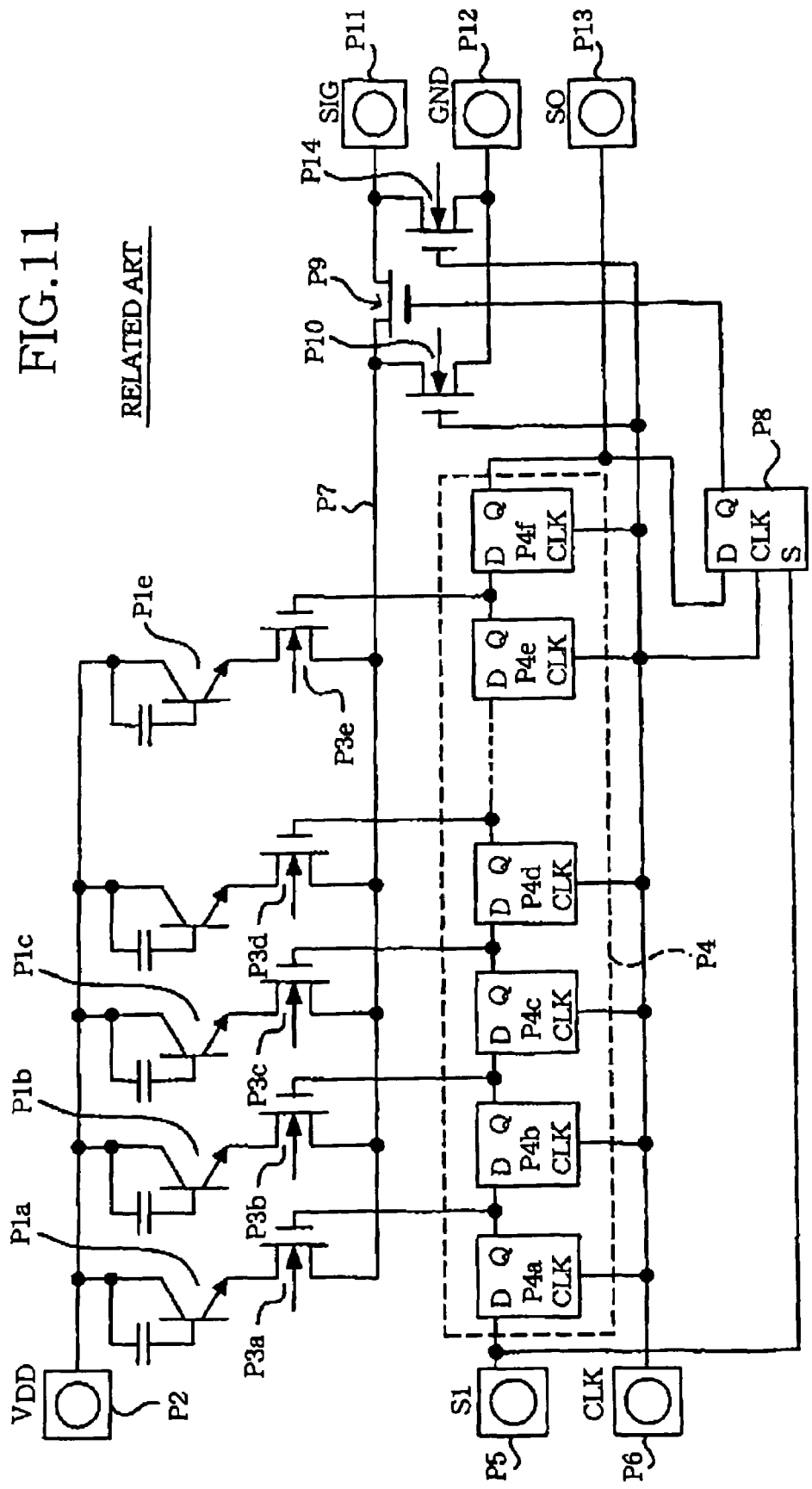
FIG. 11 is a view showing an arrangement of a conventional image sensor.

Reference is now made to FIG. 10, there will be described an image reading device 1 according to the third embodiment of this invention, which is basically identical with that of the second embodiment. In the present third embodiment, the latches 47, 49, 51, 53 are placed in the logical "1" or "0" state, depending upon the on or off state (high or low level) of the strobe signal STB and the on or off state (high or low level) of the clock pulse signal CLK, upon falling of two successive pulses of the start signal SP, as indicated in FIG. 10.

Described in greater detail, the latch 47 is placed in the logical "1" or "0" state depending upon whether the strobe signal STB is in the on or off state upon falling of the first pulse of the start signal SP. The latch 49 is placed in the logical "1" or "0" state depending upon whether the clock pulse signal CLK is in the on or off state upon falling of the first pulse of the start signal SP. The latch 51 is placed in the logical "1" or "0" state depending upon whether the strobe signal STB is in the on or off state upon falling of the second pulse of the start signal SP. The latch 53 is placed in the logical "1" or "0" state depending upon whether the clock pulse signal CLK is in the on or off state upon falling of the second pulse of the start signal SP.

As in the second embodiment, there are 16 combinations of the operating states of the four latches 47, 49, 51, 53. One of those 16 combinations is selected by the signal generating portion 7, by changing the timings of rise and fall of the two pulses of the start signal SP, or by changing the waveforms or the timings of rise and fall of the strobe signal STB and the clock pulse signal CLK, so as to change the on/off states (high/low levels) of the strobe signal STB and the clock pulse signal CLK upon rising and falling of the two pulses of the start signal SP. The resolution-setting-data generating portion 38 is arranged to generate one of 16 kinds of resolution setting data, depending upon the presently established combination of the operating states of the four latches 47, 49, 51 and 53.

In the present third embodiment, therefore, a total of 16 image resolution values are selectively available by changing the waveforms of the signals SP, STB, CLK, or the timings of rise and fall of those signals. On the basis of the resolution setting data thus generated by the resolution-setting-data generating portion 38, the shift register circuit 23 controls the analog switches 19 in the corresponding on-off patterns, so that the reading head 6 of the image reading device 1 is operated to read the image with the resolution value represented by the generated resolution setting data.

Described more specifically, the shift register circuit 23 provided in the third embodiment also incorporates changeover switches (corresponding to the changeover switches 35 provided in the first embodiment) for connecting the selected F/Fs 33 to each other, according to the generated one of the 16 different kinds of resolution setting data, and further incorporates changeover switches (corresponding to the changeover switches 37 provided in the first embodiment) for closing the selected analog switches 19 for each F/F 33.

Thus, the image reading device 1 according to the present third embodiment is arranged to selectively generate one of the 16 kinds of resolution setting data on the basis of the three signals SP, STB, CLK generated by the signal generating portion 7, so that the analog switches 19 are closed and opened by the shift register circuit 23 in the predetermined on-off control pattern determined by the generated resolution setting data, whereby the image resolution of the reading head 6 of the image reading device 1 is selected from among the 16 different values.

It is to be understood that the present invention is not limited to the details of the illustrated embodiments described above, and may be embodied with various changes and modifications, which may occur to those skilled in the art, without departing from the spirit and scope of the invention defined in the appended claims.

For example, the second embodiment may be modified such that the start signal SP and the strobe signal STB are latched upon rising and falling of the clock pulse signal CLK, or such that the start signal SP and the clock pulse signal CLK are latched upon rising and falling of the strobe signal STB. Further, the third embodiment may be modified such that the start signal SP and the strobe signal STB are latched upon falling of the two successive pulses of the clock pulse signal CLK, or such that the start signal SP and the clock pulse signal CLK are latched upon falling of the two successive pulses of the strobe signal STB.

The third embodiment may be modified such that the strobe signal STB and the clock pulse signal CLK are latched upon rising of the two successive pulses of the start signal SP.

The first embodiment may be modified such that the latch 43 prevents the start signal SP from being applied to the shift register circuit 23 for a predetermined time after the timing of rise of all of the strobe signal STB, or such that the latch 45 prevents the clock signal CLK from being applied to the shift register circuit 23 for a predetermined time after the timing of rise of fall of the strobe signal STB.

What is claimed is:

1. An image sensor comprising:
   a plurality of photoelectric converter elements each of which converts an optical signal into an electric signal;
   a plurality of channel selector switches which correspond to said photoelectric converter elements and which are selectively turned on and off to selectively connect and disconnect output portions of the corresponding photoelectric converter elements to and from a common signal line, in synchronization with a clock pulse signal;
   a first input terminal through which a resolution setting timing signal is received from an external device outside of the image sensor;
   a second input terminal through which a first resolution setting signal is received from said external device;
   a third input terminal through which a second resolution setting signal is received from said external device, the third input terminal receiving the clock pulse signal as said second resolution setting signal; and
   a resolution setting portion that receives said resolution setting timing signal, said first resolution setting signal and said second resolution setting signal, and selects one of a plurality of on-off control patterns of said plurality of channel selector switches, based on a selected one of a plurality of combinations of an on-off state of the first resolution setting signal and an on-off state of the second resolution setting signal upon at least one of rising and falling of said resolution setting timing signal, said plurality of channel selector switches being selectively turned on and off in the selected on-off control pattern, to set an image resolution value of the image sensor.

2. The image sensor according to claim 1, further comprising a shift register circuit that selectively turns on and off said plurality of channel selector switches in the on-off control pattern selected by said resolution setting portion, and wherein said resolution setting timing signal and said first resolution setting signal are selected from a group consisting of a control signal for setting said image resolution value and a start signal for starting said shift register circuit.

3. The image sensor according to claim 2, wherein said resolution setting timing signal is said control signal, and said resolution setting portion prevents said start signal from starting said shift register circuit for a predetermined length of time after a moment of said at least one of rising and falling of said resolution setting timing signal.

4. The image sensor according to claim 2, wherein said shift register circuit simultaneously turns on a plurality of adjacent switches of said plurality of channel selector switches, when said image resolution value set by said resolution setting portion is other than a highest one of a plurality of image resolution values available by an operation of said resolution setting portion, the number of said adjacent switches varying depending upon the image resolution value set by said resolution setting portion.

5. The image sensor according to claim 1, wherein said resolution setting portion is operated to set said image resolution value before each line of image is read by operation of said plurality of photoelectric converter elements and said plurality of channel selector switches.

6. The image sensor according to claim 1, wherein said resolution setting portion is operated to set said image resolution value before each page of image is read by operation of said plurality of photoelectric converter elements and said plurality of channel selector switches.

7. The image sensor according to claim 1, wherein the number of said plurality of on-off control patterns of said plurality of channel selector switches is equal to a multiple of four, and said plurality of on-off control patterns correspond to respective different values of the image resolution of the image sensor.

8. The image sensor according to claim 1,
   wherein said resolution setting portion receives from said external device said first resolution setting signal and said second resolution setting signal through said second and third input terminals, respectively, before each page of image is read with said plurality of channel selector switches being selectively turned on to connect said output portions of the corresponding photoelectric converter elements to said common signal line.

9. The image sensor according to claim 2, wherein said resolution setting portion includes one of (a) a first portion for changing a moment at which the on-off states of the first and second resolution setting signals respectively received through said second and third input terminals from said external device are detected to select one of the plurality of on-off control patterns of the plurality of channel selector switches, and (b) a second portion for changing the on-off states of the first and second resolution setting signals at a predetermined moment of detection of the on-off states of the first and second resolution setting signals,
   wherein said shift register circuit simultaneously turns on a plurality of adjacent switches of said plurality of channel selector switches, when said image resolution value set by said resolution setting portion is other than a highest one of a plurality of image resolution values available by an operation of said resolution setting portion, the number of said adjacent switches varying depending upon the image resolution value set by said resolution setting portion.

10. The image sensor according to claim 9, wherein said shift register circuit turns on successive groups of the channel selector switches each group consisting of said plurality of adjacent switches, in synchronization with respective successive pulses of said clock pulse signal, when the image resolution value set by said resolution setting portion is other than the highest value.

11. An image sensor according to claim 8, wherein said resolution setting portion includes one of (a) a first portion for changing a moment at which the on-off states of the first and second resolution setting signals are detected to select one of the plurality of on-off control patterns of the plurality of channel selector switches, and (b) a second portion for changing the on-off states of the first and second resolution setting signals at a predetermined moment of detection of the on-off states of the first and second resolution setting signals.

12. An image reading device comprising:
an image sensor as defined in claim 1;
a resolution-setting-timing-signal generating portion that generates said resolution setting timing signal which is received by said resolution setting portion from said external device through said first input terminal;
a first resolution-setting-signal generating portion that generates said first resolution setting signal which is received by said resolution setting portion from said external device through said second input terminal;
a second resolution-setting-signal generating portion that generates said clock pulse signal as said second resolution setting signal which is received by said resolution setting portion from said external device through said third input terminal; and
a control portion that controls said resolution-setting-timing-signal generating portion and said first and second resolution-setting-signal generating portions.

13. The image reading device according to claim 12, wherein said image sensor further comprises a shift register circuit that selectively turns on and off said plurality of channel selector switches in the on-off control pattern selected by said resolution setting portion, and wherein said resolution setting timing signal and said first resolution setting signal, which are respectively generated by said resolution-setting-timing-signal generating portion and said first and resolution-setting-signal generating portion, are selected from a group consisting of a control signal for setting said image resolution value, and a start signal for starting said shift register circuit.

14. The image reading device according to claim 13, wherein said resolution-setting-timing-signal generating portion and said first and second resolution-setting-signal generating portions generate said control signal, said start signal and said clock pulse signal, respectively, and said control portion controls the on-off states of said start signal and said clock pulse signal upon at least one of rising and falling of said control signal.

15. The image reading device according to claim 13, wherein said resolution setting timing signal is said control signal, and said shift register circuit is not started by said start signal for a predetermined length of time after a moment of said at least one of rising and falling of said resolution setting timing signal.

16. The image reading device according to claim 13, wherein said resolution-setting-timing-signal generating portion generates said control signal and said clock pulse signal, as said resolution setting timing signal, and said control portion controls said first resolution-setting-signal generating portion to generate said start signal, to start said shift register circuit, after said image resolution value is set by said resolution setting portion.

17. The image reading device according to claim 12, wherein said resolution setting portion is operated to set said image resolution value before each line of image is read by operations of said plurality of photoelectric converter elements and said plurality of channel selector switches.

18. The image reading device according to claim 12, wherein said resolution setting portion is operated to set said image resolution value before each page of image is read by operation of said plurality of photoelectric converter elements and said plurality of channel selector switches.

19. The image reading device according to claim 12, wherein said shift register circuit simultaneously turns on a plurality of adjacent switches of said plurality of channel selector switches, when said image resolution value set by said resolution setting portion is other than a highest one of a plurality of image resolution values available by an operation of said resolution setting portion, the number of said adjacent switches varying depending upon the image resolution value set by said resolution setting portion.

20. The image reading device according to claim 19, wherein said shift register circuit turns on successive groups of the channel selector switches, each group consisting of said plurality of adjacent switches, in synchronization with respective successive pulses of said clock pulse signal, when the image resolution value set by said resolution setting portion is other than the highest value.

21. The image reading device according to claim 20, further comprising a feeding device that moves a row of said photoelectric converter elements and an original carrying an image, relative to each other in a direction perpendicular to a direction of extension of said row, at a speed which increases with an increase in the number of said plurality of adjacent switches that are simultaneously turned on.

22. The image sensor according to claim 12, wherein the number of said plurality of on-off control patterns of said plurality of channel selector switches is equal to a multiple of four, and said plurality of on-off control patterns correspond to respective different values of the image resolution of the image sensor.

23. The image reading device according to claim 12, wherein said resolution-setting-timing-signal generating portion changes a moment of rising or falling of said resolution setting timing signal, depending upon said image resolution value to be set by said resolution setting portion, while said first and second resolution-setting-signal generating portions generate said first and second resolution setting signals such that a pulse of each of said first and second resolution setting signals rises and falls at respective predetermined fixed first and second moments relative to said moment of said at least one of rising and falling of said resolution setting timing signal.

24. The image reading device according to claim 12, wherein said first and second resolution-setting-signal generating portions change a moment of at least one of rising and falling of each of said first and second resolution setting signals, depending upon said image resolution value to be set by said resolution setting portion, while said resolution-setting-timing-signal generating portion generates said resolution setting timing signal such that a pulse of said resolution setting timing signal rises and falls at respective predetermined fixed moments.

25. The image reading device according to claim 24, wherein said first and second resolution-setting-signal generating portions change the moment of falling of each of said first and second resolution setting signals relative to the predetermined moment of falling of said resolution setting timing signal.

26. The image reading device according to claim 24, wherein said first and second resolution-setting-signal generating portions change the moments of rising and falling of each of said first and second resolution setting signals relative to the moments of rising and falling of said resolution setting timing signal.

27. The image reading device according to claim 24, wherein said first and second resolution-setting-signal generating portions change the moments of rising and falling of each of said first and second resolution setting signals relative to moments of falling of two successive pulses of said resolution setting timing signal.

28. An image reading device comprising:
a plurality of photoelectric converter elements each of which converts an optical signal into an electric signal;
a signal generating portion that generates a start signal and a clock pulse signal;
a plurality of channel selector switches which correspond to said photoelectric converter elements and which are selectively turned on and off to selectively connect and disconnect output portions of the corresponding photoelectric converter elements to and from a common signal line, in synchronization with said clock pulse signal;
a shift register circuit that selectively turns on and off said plurality of channel selector switches, said shift register circuit being started by said start signal; and
a resolution setting portion that receives said start signal and said clock pulse signal, and selects one of a plurality of on-off control patterns of said plurality of channel selector switches, based on a selected one of a plurality of combinations of an on-off state of said start signal and an on-off state of said clock pulse signal, said plurality of channel selector switches being selectively turned on and off in the selected on-off control pattern, to set an image resolution value of the image sensor,
said resolution setting portion including one of (a) a first portion for changing a moment of selection of one of the plurality of on-off control patterns of the plurality of channel selector switches based on the combination of the on-off state of said start signal and the on-off state of said clock pulse signal, and (b) a second portion for changing the on-off state of said start signal and the on-off state of said clock pulse signal at a predetermined moment of selection of one of the on-off control patterns of the plurality of channel selector switches.

29. A method of setting an image resolution of an image sensor comprising a plurality of photoelectric converter elements each of which converts an optical signal into an electric signal, a plurality of channel selector switches which correspond to said photoelectric converter elements and which are selectively turned on and off to selectively connect and disconnect output portions of the corresponding photoelectric converter elements to and from a common signal line, in synchronization with a clock pulse signal, and a shift register circuit that selectively turns on and off said plurality of channel selector switches, said method comprising the steps of:
receiving a resolution setting timing signal, a first resolution setting signal and a second resolution setting signal, through first, second and third input terminals, respectively, from an external device outside of the image sensor; and
selecting one of a plurality of on-off control patterns of said plurality of channel selector switches, based on a selected one of a plurality of combinations of an on-off state of the first resolution setting signal and an on-off state of the second resolution setting signal upon at least one of rising and falling of said resolution setting timing signal, said plurality of channel selector switches being selectively turned on and off in the selected on-off control pattern, to set an image resolution value of the image sensor,
wherein said second resolution setting signal is said clock pulse signal, and said resolution setting timing signal and said first resolution setting signal are selected from a group consisting of a control signal for setting said image resolution value and a start signal for starting said shift register circuit.

30. The method according to claim 29, wherein the number of said plurality of on-off control patterns of said plurality of channel selector switches is equal to a multiple of four, and said plurality of on-off control patterns correspond to respective different values of the image resolution of the image sensor.

* * * * *